United States Patent
Stachura et al.

(10) Patent No.: US 11,665,150 B2
(45) Date of Patent: May 30, 2023

(54) SYSTEM AND METHOD FOR CREDENTIALED ACCESS TO A REMOTE SERVER

(71) Applicant: Pleasant Solutions, Inc., Edmonton (CA)

(72) Inventors: Thomas Stachura, Edmonton (CA); Patrick W. Earl, Edmonton (CA)

(73) Assignee: Pleasant Solutions, Inc., Edmonton (CA)

( * ) Notice: Subject to any disclaimer, the term of this patent is extended or adjusted under 35 U.S.C. 154(b) by 0 days.

(21) Appl. No.: 14/542,269

(22) Filed: Nov. 14, 2014

(65) Prior Publication Data

US 2015/0134956 A1 May 14, 2015

Related U.S. Application Data

(60) Provisional application No. 61/904,082, filed on Nov. 14, 2013.

(51) Int. Cl.
*H04L 9/40* (2022.01)

(52) U.S. Cl.
CPC ...... *H04L 63/0807* (2013.01); *H04L 63/0815* (2013.01); *H04L 63/168* (2013.01)

(58) Field of Classification Search
CPC ............. H04L 63/0815; H04L 63/0807; H04L 63/0861; H04L 63/0853; H04L 63/10; H04L 63/0407; H04L 63/0421
See application file for complete search history.

(56) References Cited

U.S. PATENT DOCUMENTS

| | | | | |
|---|---|---|---|---|
| 6,081,900 A | * | 6/2000 | Subramaniam | G06Q 20/382 |
| | | | | 707/999.01 |
| 6,405,318 B1 | * | 6/2002 | Rowland | G06F 21/552 |
| | | | | 726/22 |
| 7,540,022 B2 | * | 5/2009 | Barari | G06F 21/335 |
| | | | | 726/10 |

(Continued)

FOREIGN PATENT DOCUMENTS

| WO | 2002093377 A1 | 11/2002 |
|---|---|---|
| WO | 2009070430 A2 | 6/2009 |

OTHER PUBLICATIONS

Florencio, D. and C. Herley. (Sep. 2008) One-time password access to any server without changing the server. Proc. ISC '08, Taipei, pp. 1-16.

(Continued)

*Primary Examiner* — Zachary A. Davis
(74) *Attorney, Agent, or Firm* — Banner & Witcoff, Ltd.

(57) ABSTRACT

Credentials for an account on a remote server requiring credentialed access by a client device are created, credentials are transmitted to the remote server, and response data including the credentials is received from the remote server, while restricting access to the credentials by the client device at all times. Session data transmitted by the remote server is also restricted from the client device to prevent side loading of session secrets onto client devices that may be used to attempt to gain unauthorized access to the remote server. Cookies are used to allow the client device to access more than one remote server without having to authenticate individually to each remote server.

37 Claims, 13 Drawing Sheets

(56) References Cited

U.S. PATENT DOCUMENTS

| | | | |
|---|---|---|---|
| 7,681,246 B1* | 3/2010 | Chen | G06F 21/64 380/251 |
| 8,214,635 B2* | 7/2012 | Wang | H04L 63/0464 713/156 |
| 8,255,696 B2 | 8/2012 | Florencio et al. | |
| 8,281,147 B2 | 10/2012 | Herley et al. | |
| 8,312,540 B1* | 11/2012 | Kahn | H04L 63/1425 726/22 |
| 8,340,283 B2* | 12/2012 | Nadalin | H04L 63/02 380/28 |
| 8,391,494 B1* | 3/2013 | Serenyi | H04L 63/0428 380/278 |
| 8,417,937 B2* | 4/2013 | Mangalore | H04L 63/0464 380/200 |
| 8,495,716 B1 | 7/2013 | Newstadt et al. | |
| 8,621,586 B1* | 12/2013 | Peer | H04L 63/1425 726/7 |
| 8,984,274 B1* | 3/2015 | Kerzner | H04L 9/0891 713/150 |
| 9,282,098 B1* | 3/2016 | Hitchcock | H04L 63/0884 |
| 9,363,256 B2* | 6/2016 | Caldwell | H04L 63/08 |
| 9,444,620 B1* | 9/2016 | Murphy | H04L 9/0822 |
| 9,608,993 B1* | 3/2017 | Camenisch | H04W 12/0802 |
| 2001/0037469 A1 | 11/2001 | Gupta et al. | |
| 2004/0098609 A1 | 5/2004 | Bracewell et al. | |
| 2005/0015490 A1 | 1/2005 | Saare et al. | |
| 2006/0230265 A1 | 10/2006 | Krishna | |
| 2008/0222706 A1* | 9/2008 | Renaud | H04L 63/1408 726/4 |
| 2012/0284786 A1 | 11/2012 | Somani et al. | |
| 2013/0042104 A1 | 2/2013 | Wicker | |
| 2014/0012740 A1* | 1/2014 | Carson | G06Q 40/00 705/39 |
| 2015/0039712 A1* | 2/2015 | Frank | H04L 67/40 709/212 |

OTHER PUBLICATIONS

Florencio, D. and C. Herley. (Dec. 2006) KLASSP: Entering passwords on a spyware infected machine. ACSAC '06: Proceedings of the 22nd Annual Computer Security Applications Conference on Annual Computer Security Applications Conference (2006), pp. 1-10.

Gaber, P. Gibbons, Y. Matyas, and A. Mayer. (1997) How to make personalized web browsing simple, secure and anonymous. Proc. Finan. Crypto'97, pp. 17-31.

Jammalamadaka, R.C., van der Horst, T.W., Mehrotra, S., Seamons, K. and N. Venkasubramanian. (2006) Delegate: a proxy based architecture for secure website access from an untrusted machine. Computer Security Applications Conference, ACSAC '06. 22nd Annual, pp. 1-10.

Pashalidis, A. and C.J. Mitchell, C.J. (2003) A taxonomy of single sign-on systems. Information Security and Privacy, pp. 249-264. Springer Berlin Heidelberg.

Pashalidis, A. and C.J. Mitchell, C.J. (2004) Impostor: A single sign-on system for use from untrusted devices. Global Telecommunications Conference, GLOBECOM'04. IEEE, vol. 4:2191-2195.

Wu, M., Garfinkel, S. and R. Miller. (2004) Secure web authentication with mobile phones. In DIMACS Workshop on Usable Privacy and Security Software.

May 9, 2017—(EP) Communication with European Search Report—App 14861225.2.

Feb. 21, 2020 (IN)—First Examination Report—App 201617017687.

Jun. 3, 2019—(EP) Communication and European Search Report—App 19165758.4.

Feb. 3, 2015—(WO) International Search Report and Written Opinion—App PCT/CA2014/000840.

* cited by examiner

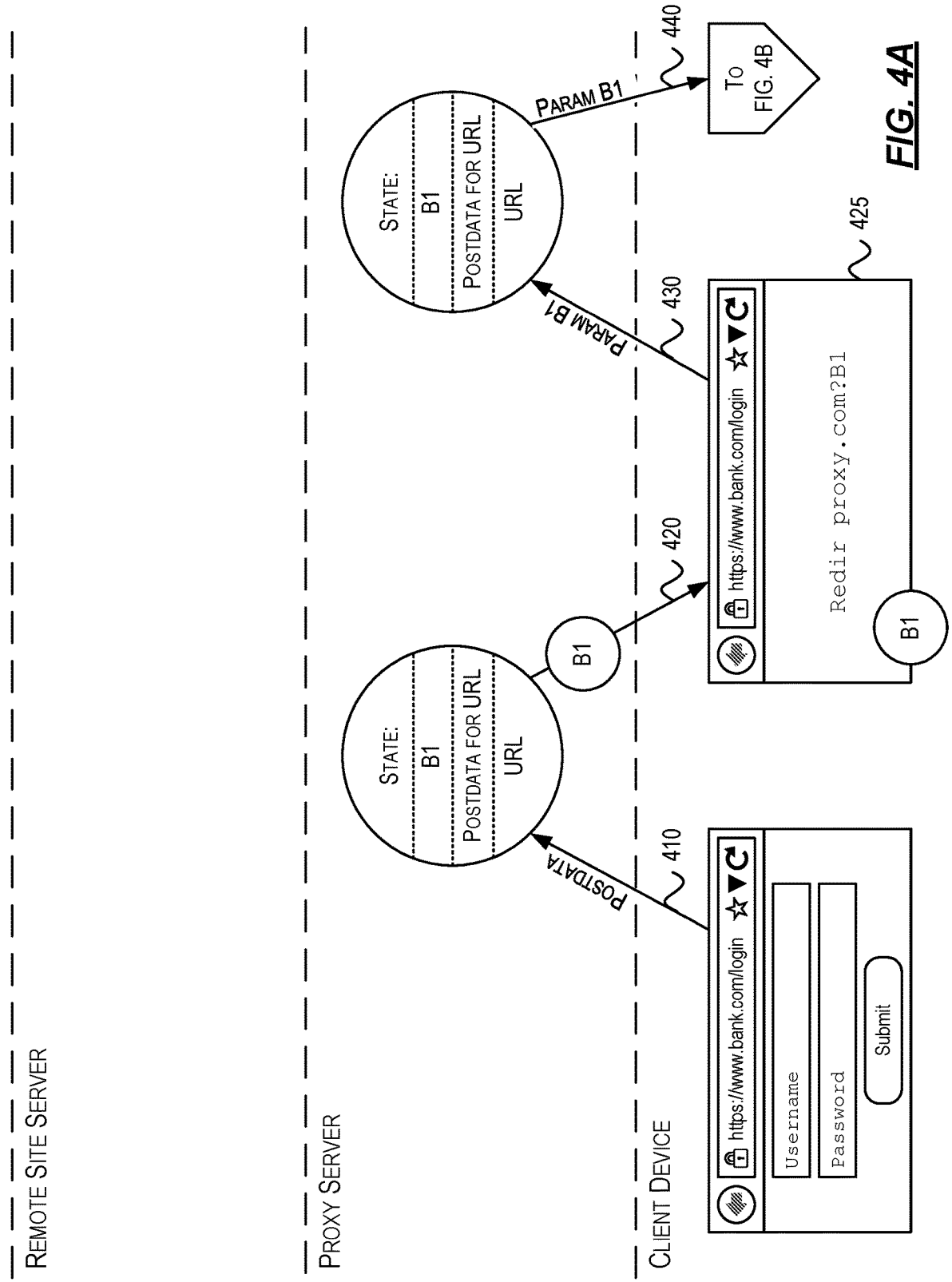

NEW ACCOUNT CREATION

*FIG. 5A*

SYSTEM AND METHOD FOR CREDENTIALED ACCESS TO A REMOTE SERVER

CROSS REFERENCE TO RELATED APPLICATION

This application claims the priority benefit of U.S. Provisional Patent Application No. 61/904,082, filed on Nov. 14, 2013, entitled "Credential Management System and Method", the entire contents of which are incorporated herein by reference.

FIELD OF THE INVENTION

The present invention relates to computer implemented systems and methods for creating accounts for remote servers requiring credentialed access, and managing requests by client devices to access remote servers requiring credentials.

BACKGROUND OF THE INVENTION

Credentials allow a remote server to authenticate a client device or user before allowing the client device or user to access resources, such as a website, hosted by the remote server. Such credentials often include conventional login controls which include username and password identification. Once the remote server has initiated a session with the client device, the remote server may transmit session information that can be used in determining whether to allow subsequent access to the remote server by the client device.

It may be desirable in some organizations to allow individual users access to a remote server which requires such credentials, without disclosing or allowing access to those credentials or session information to the client device and its user. It may also be desirable in some organizations to have the convenience of single sign-on (SSO) across many remote servers including remote servers that have not specifically added support for SSO systems.

SUMMARY OF THE INVENTION

The following is a summary of the invention. Other features of the invention will become apparent from the following detailed description. It should be understood, however, that the detailed description and the specific embodiments, while indicating preferred embodiments of the invention, are given by way of illustration only.

In one aspect, the present invention comprises a computer implemented method for providing a client device with credentialed access to a remote server, the method comprising the steps of:
  (a) upon a request by the client device for access to the remote server, transmitting, to the remote server, a credential required by the remote server to provide the client device with access to the remote server;
  (b) receiving, from the remote server, session data comprising a session secret required by the remote server to provide the client device with subsequent access to the remote server; and
  (c) upon a request by the client device for subsequent access to the remote server, transmitting the session secret to the remote server;
  wherein access by the client device to the credential and the session secret is restricted.

In one embodiment, the method further comprises the steps of: encrypting the session secret, wherein access by the client device to the encrypted session secret is not restricted; storing the encrypted session secret; and decrypting the stored encrypted session secret to determine the session secret transmitted to the remote server.

In one embodiment, either one or a combination of transmitting the credentials, receiving session data, or transmitting the session secret is performed in accordance with an HTTP or HTTPS protocol.

In one embodiment, the client device transmits a plurality of requests for access to a plurality of remote servers, and the method further comprises the step of selectively routing the request to the remote server.

In one embodiment, the remote server comprises a plurality of accounts each associated with a different credential, and the method further comprises the step of transmitting, to the client device, a notification indicating which of the accounts are accessible by the client device.

In one embodiment, the method further comprises the steps of: receiving the request for access to the remote server, wherein the request comprises a placeholder for the credential, from the client device; inserting the credential into the request based on the position of the placeholder within the request; and wherein transmitting the credential to the remote server comprises transmitting the request with the credential inserted therein.

In one embodiment, the method further comprises the step of authenticating the client device to a proxy server by authentication data received from the client device. The authentication data may comprise a user name or a password, biometric data, or data sent out-of-band to the client device such as a one-time code.

In one embodiment, access by the client device to the credential is restricted by, upon receiving, from the remote server, response data comprising the credential, removing the credential from response data before allowing the response data to be transmitted to the client device. Removing the session credential from the response data may comprise substituting non-credential data for the credential in the response data.

In one embodiment, the method further comprises the step of recognizing a target URI or data field of the remote server to which the credential is to be transmitted, and wherein the credential is selectively transmitted to the target URI or data field. The target URI or data field may be determined based on data received from the remote server indicative of one or more of: a URI or data field name; a URI or data field reference; the number of URIs or data fields; a URI or data field length; a URI or data field display characteristic; or URI or data field input type. Alternatively, the target URI or data field may be determined based on data previously exchanged between the remote server and different client devices.

In one embodiment, the method further comprises the step of restricting access to at least a portion of the remote server based on data received from the remote server indicative of one or more of: a URI or data field name; a URI or data field reference; the number of URIs or data fields; a URI or data field length; a URI or data field display characteristic; or URI or data field input type.

In one embodiment, the method further comprises the step of identifying the session secret within the session data. Identification of the session secret within the session data may be based on evaluating one or a combination of the following attributes of the session data: a length of a character string; a presence of a specified character; or a pattern of characters. Alternatively, identification of the session secret within the session data may be based on detecting an absence or a presence of a script referencing the session data.

In one embodiment, access by the client device to the session secret is restricted by removing the session secret from the session data before allowing the session data to be transmitted to the client device. Removing the session secret from the session data may comprise substituting non-secret data for the session secret in the session data.

In one embodiment, the method further comprises the step of recognizing a target URI or data field of the remote server to which the session is to be transmitted, and wherein the session secret is selectively transmitted to the target URI or data field. The target URI or data field is recognized based on data received from the remote server indicative of one or more of: a URI or data field name; a URI or data field reference; the number of URIs or data fields; a URI or data field length; a URI or data field display characteristic; or URI or data field input type.

In another aspect, the present invention comprises a system comprising a processor and an operatively connected memory storing a set of instructions, wherein the processor is responsive to the set of instructions to implement any one of the methods for providing a client device with credentialed access to a remote server, as described above.

In another aspect, the present invention comprises a computer implemented method for creating an account for a remote server requiring credentialed access by a client device, the method comprising the steps of:
 (a) upon a request by the remote server to create or modify the credential, receiving a credential input from the client device;
 (b) generating or modifying the credential in accordance with an algorithm operating on the credential input, wherein the generated or modified credential is different than the credential input; and
 (c) transmitting the generated or modified credential to the remote server;
wherein access by the client device to the credential is restricted.

In one embodiment, the credential input is an alphanumeric string specifying one or a combination of the following parameters for credential generated by the algorithm: a number of characters; a character format; or a character order.

In one embodiment, the method further comprises the step of creating a human-readable credential record indicating that access by the client device to the credential is restricted.

In another aspect, the present invention comprises a system comprising a processor and an operatively connected memory storing a set of instructions, wherein the processor is responsive to the set of instructions to implement any one of the methods for creating an account for a remote server requiring credentialed access by a client device, as described above.

In another aspect, the present invention provides a computer implemented method for identifying a client device across requests for a first remote server and a second remote server, the method comprising the steps of:
 (a) upon a first request for the client device to access the first remote server, identifying the client device based on a first cookie specific to access requests associated with the first remote server;
 (b) transmitting a second cookie to be used for access requests associated with the second remote server, to the client device;
 (c) upon a second request for the client device to access the second remote server, the second request comprising the second cookie, identifying the client device by the second cookie; and
 (d) upon identifying the client device by the second cookie, taking a related action comprising transmitting a credential required by the second remote server to provide the client device with access to the second remote server, to the second remote server;
wherein access by the client device to the credential is restricted.

In another aspect, the present invention comprises a system comprising a processor and an operatively connected memory storing a set of instructions, wherein the processor is responsive to the set of instructions to implement a method for identifying a client device across requests for a first remote server and a second remote server, the method comprising the steps of:
 (e) upon a first request for the client device to access the first remote server, identifying the client device based on a first cookie specific to access requests associated with the first remote server;
 (f) transmitting a second cookie to be used for access requests associated with the second remote server, to the client device;
 (g) upon a second request for the client device to access the second remote server, the second request comprising the second cookie, identifying the client device by the second cookie; and
 (h) upon identifying the client device by the second cookie, taking a related action comprising transmitting a credential required by the second remote server to provide the client device with access to the second remote server, to the second remote server;
wherein access by the client device to the credential is restricted.

In one embodiment, the system comprises an HTTP/HTTPS proxy server, intended for organizations of various sizes, that has access to website credentials and allows browsing employees or users to be logged into websites without knowing the credentials to each one. As a result, the organization may enjoy the benefit of higher security as the users will never know the actual password, which reduces many types of security risks. Furthermore, as a single point of access, many authentication technologies such as two-factor authentication (biometric authentication, or single-use temporary passwords) can be used and required for access to all sites. As a matter of convenience, the users do not need to remember or hunt down a multitude of different credentials. As well, implementation allows full control to the organization, who can limit access to any site by user, website, time of day, or client device, or other control parameter.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 4A shows a schematic representation of one embodiment of a method of proxy authentication in which the user attempts to access the remote site and is redirected to the proxy server;

FIG. 5A shows a schematic representation of one embodiment of a method of the present invention for creating a new account wherein the user creates a new account at the remote site and the account credentials are sent to the proxy server;

DETAILED DESCRIPTION OF PREFERRED
EMBODIMENTS OF THE INVENTION

The present invention relates to methods and systems for creating of accounts for remote servers requiring credentialed access, and managing requests by client devices to access remote servers requiring credentials. The client device is restricted from accessing the credentials, such that the credentials remain unknown to the user of the client device. The client device is also restricted from accessing the session secrets, such that the session secrets remain unknown to the user of the client device.

Figure 1:
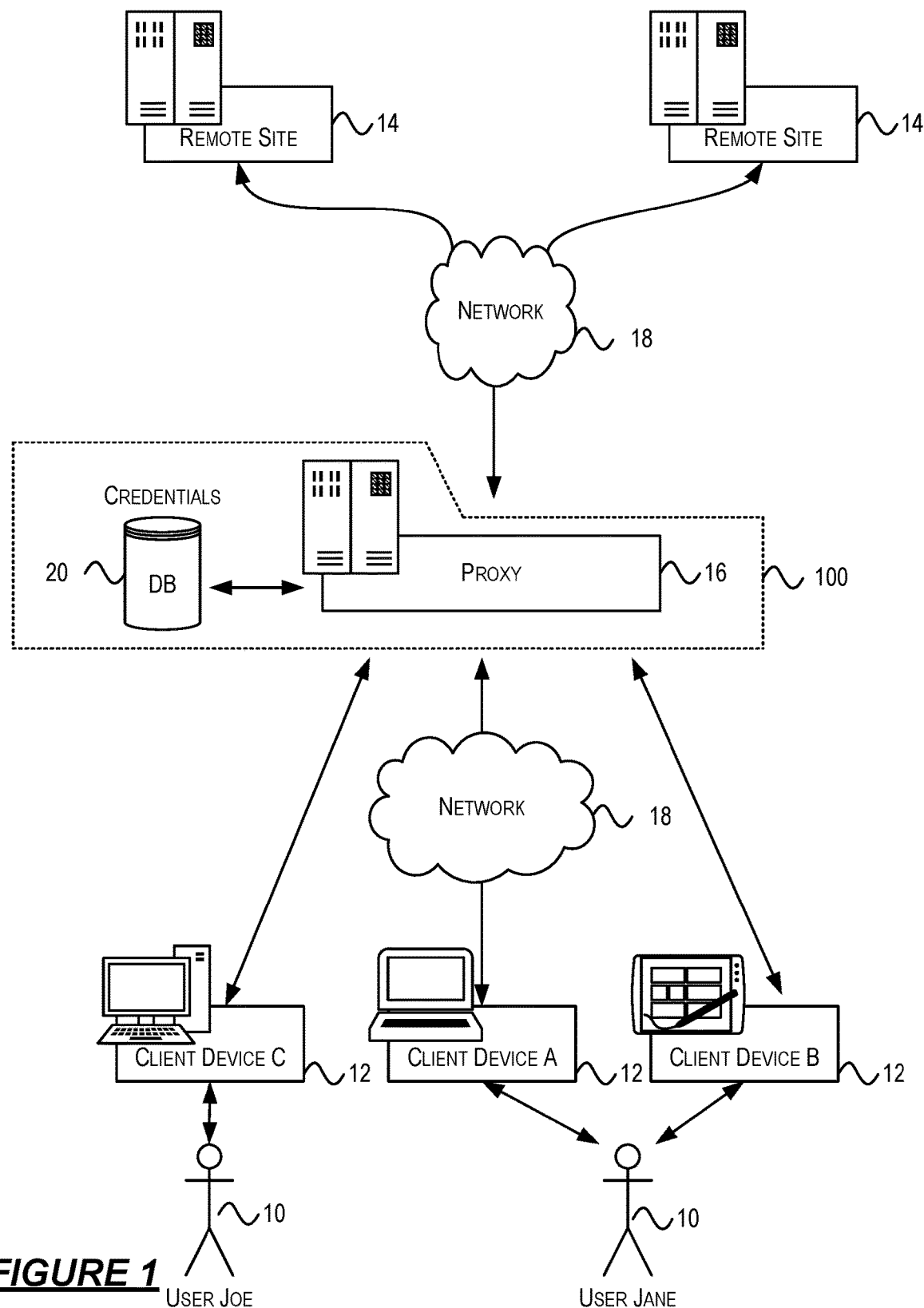
FIG. 1 shows a schematic representation of one embodiment of the system of the present invention in use with a plurality of client devices used by different users.

FIG. 1 schematically illustrates one embodiment of the system (100) of the present invention in use with a plurality of client devices (12) used by users (10) to exchange data with a plurality of remote servers (14). Each client device (12) is connected to a proxy server (16) by a communication network (18). The proxy server (16) is also connected to the remote server (14) by the communications network (18). As used herein, "inline" refers to communications which occur within the same or previously established communication method or channel.

In embodiments of the present invention, "inline" communications and interactions between user (10) and client device (12) are those communications and interactions where the user's actions are within or typical of conventional logins without a proxy server (16) for a given remote server (14), or where the user (10) communicates with the client device (12) with actions that are typical of typical logins without a proxy server (16), or where the user (10) communicates with the client device (12) without requiring actions beyond those that typical logins without a proxy server (16) would have for a given remote server (14).

"Inline" communications between the client device (12) and the proxy server (16) are those communications where the client device (12) communicates with the proxy server (16) using or within the typical channels, signals, and protocols of typical logins without a proxy server (16), or where the client device (12) communicates with the proxy server (16) without requiring channels, signals, or protocols beyond what typical logins without a proxy server (16) would contain for a given remote server (14).

As used herein, "out-of-band" refers to communications which occur outside of a previously established communication method or channel.

In the context of authentication, "out-of-band" refers to simultaneously utilizing a primary network or channel, and a secondary network or channel being different from the primary network or channel to communicate between two parties or client devices (12) for identifying a user (10). A cellular network is commonly used for out-of-band authentication. An example of out-of-band authentication is when an online banking user (10) is accessing his or her online bank account using a client device (12) mobile phone via the Internet with a login and a one-time password is sent to their client device (12) mobile phone via SMS to identify them. The primary channel would be the online login screen where the user (10) enters his or her login information and the secondary channel would be the SMS cellular network.

In embodiments of the present invention, out-of-band communications are those which are extraneous to, or atypical of a regular user interaction with the remote server (14) without the proxy server (16).

As used herein, a computing device such as a client device (12) is "restricted" from accessing a data item when the data item resides on a data path that is not in communication with the client device, where access to the path is protected by a password unknown to the user of the client device (12), where the data item is encrypted and the encryption algorithm or key is unknown to the user of the client device (12), or where the data item has been removed or otherwise rendered inaccessible to the data path, or a combination of the foregoing.

Client Device

The client device (12) can be any computing device capable of communicating over a communications network (18) accessing resources of a remote server (14) and proxy server (16), and exchanging data with the remote server (14) or proxy server (16). For example, and without limitation, the computing device may be a smart phone, a personal computer such as a laptop or desktop computer, set-top box, a tablet computer, or a user-less automated server.

In one embodiment, the client device (12) requires only a functional browser and basic HTTP proxy support, and no plug-ins or other added functionality are required. An alternative is for the client device (12) to have custom browser software or browser add-ins.

Remote Server

The remote server (14) may comprise any computing device having resources and/or hosting a service for managing or sending the resources, such as objects, data, functionalities, and the like. For example, and without limitation, the resource may be a website comprising a plurality of webpages. The remote server (14) requires authentication of a client device (12) before sharing a resource with the client device (12) requesting access to the remote server (14). The remote server (14) is typically referenced by a Uniform Resource Locator (URL) or Universal Resource Identifier (URI). A URL or URI is used by the client device (12), for initiating access to the remote server (14). In other cases, a remote server (14) may be referenced by an abstract domain in extensible markup language (XML) such as a namespace.

Proxy Server and Memory

Generally, any of the methods and abilities described herein can be implemented using software, firmware, hardware (e.g., fixed-logic circuitry), manual processing, or any suitable combination of these implementations. The system (100) generally represents software, firmware, hardware, or any combination thereof. In the case of a software implementation, for instance, the system (100) will include a resource access manager comprising computer-executable program code that performs specific tasks when executed on a processor. The program code can be stored in one or more computer-readable media devices, such as memory media and/or storage media. The features and techniques described herein are platform-independent, meaning that they may be implemented on a variety of commercial computing platforms having a variety of processors and operating systems.

In the embodiment shown in FIG. 1, the system (100) comprises a proxy server (16) and an operatively connected memory (20). The proxy server (16) may comprise any computing device capable of communicating over a communication network (18) with the client device (12) and the remote server (14). The proxy server (16) and memory (20) may comprise one or more computing devices or systems and data storage media acting in concert. A proxy server (16) and memory (20) may be chained to another proxy server and memory (20). Some portions of the proxy server (16) or one or more of the chained proxy servers (16) may reside on the client device (12).

In one embodiment, the system (100) can deal with new or changing remote server (14) sites without prior configuration for each site, or creation or recording of login automation scripts for each site.

In one embodiment, the system (100) may maintain approval of usage workflow in real-time (other individual users using other devices approve or deny requests) or based on rules which govern individual access to remote servers (14) (where, when, who, how often, etc).

Communications Network

The communication network (18) may include any suitable network for the client devices (12), remote server (14) and proxy server (16) to exchange data. The communications network (18) may, without limitation, comprise the Internet, a local-area network, a wide-area network, a wireless network, a personal-area network, a dial-up network, a USB bus, a wired or wireless telephone network, or a combination of the foregoing.

The systems and methods described herein are independent of communication network protocols between the client device (12) and the proxy server (16), and between the remote server (14) and the proxy server (16). In embodiments, the protocols may comprise TCP/IP, HTTP, HTTPS, FTP, proprietary protocols, or any other suitable protocol.

Method for Providing Credentialed Access to a Remote Server

In one aspect, the present invention provides a method for providing credentialed access by a client device (12) to a remote server (14). In one embodiment, there are five stages of the method, as shown schematically in FIGS. 2, 3A, and 3B, as follows.

Stage 1

In a first stage (stage 1 in FIG. 2), the user (10) interacts with the client device (12) to indicate a desire to access the remote server (14). This may be as simple as the user (10) navigating a browser on the client device (12) to the remote server (14) address and receiving back a login page, the user (10) simply clicking the typical "submit" button on the login page, or the user (10) activating a biometric authentication device while navigating a browser on the client device (12).

Figure 3A:
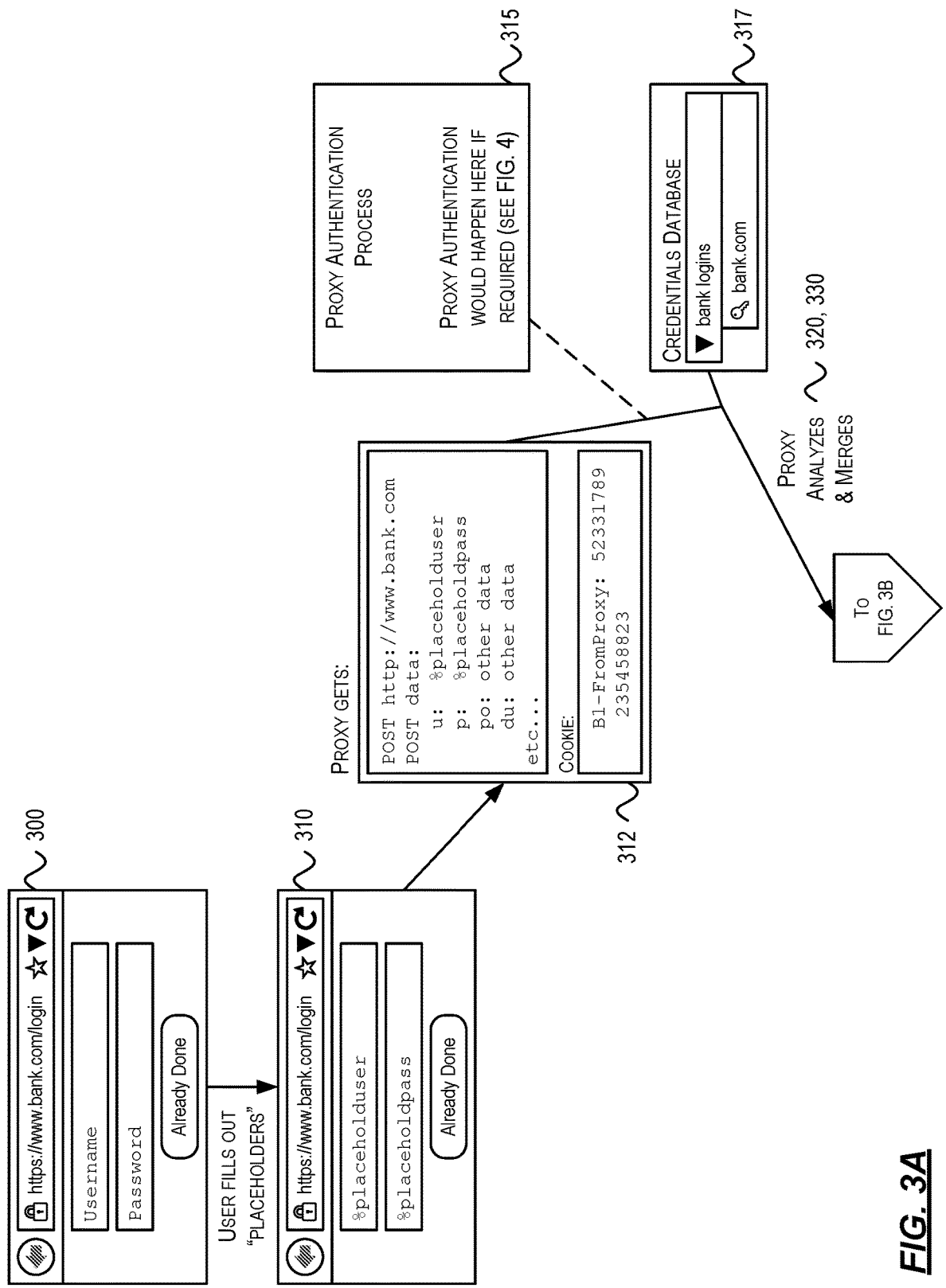
FIG. 3A shows a schematic representation of one embodiment of a method of the present invention, where the proxy server retrieves credentials for the remote server based on placeholders inserted into the username and password fields of a remote server login web page.

In one embodiment, the user (10) initiates the process by using a browser on the client device (12) to visit a remote server (14) site requiring a login (step 300 in FIG. 3A). The form element presented by the remote server (14) may be a conventional login page, requiring the input of a login username and a password. The user (10) may then, using the browser on the client device (12), insert a placeholder in both the username field and the password field, or only the password field (step 310). In one embodiment, client device (12) may have custom software, a customized browser or browser plug-in that communicates with the proxy server (16). At the login stage, the proxy server (16) may transmit a notification to the client device (12), which is displayed by the client device (12) to indicate an account or several accounts associated with the remote server (14) that the client device (12) is permitted to log into.

The placeholder may be any string of text which is recognizable by the proxy server (16). The placeholder may be inserted manually by the user (10) or automatically by the client device (12) browser. The browser may comprise plug-ins, or an ability to remember placeholders, or be modified by custom software or automated scripts to insert the placeholder. Alternatively, the placeholder may be inserted by the proxy server (16) itself, such as in the instance where the client device (12) has previously accessed that particular remote server (14) site, as may be noted in a browser cookie stored in the client device (12) memory. The proxy server (16) may modify the webpage with the input form that is sent to the client device (12). Alternatively, the proxy (16) may modify or insert scripts into the webpage with the input form that is sent to the client device (12).

The placeholder may be the same or different for all remote servers (14), groups of remote servers (14), or individual remote servers (14), and may be the same or different for individual users (10) and client devices (12). Placeholders can be unchanging, change each time, or in some situations, any non-specific value will suffice.

In one embodiment, once placeholders have been inserted into the correct fields (e.g., username and password fields), the user (10) may then click on the login button on the browser, or otherwise manually or automatically indicate the desire to continue the login process (step 312 in FIG. 3A). In one embodiment, where login proceeds automatically unless cancelled by the user (10), the user (10) not taking any action will indicate that login is indeed wanted. In an alternative embodiment, the user (10) may click on the login button on the browser even before the placeholder is inserted. The placeholder may be inserted automatically or by the proxy server (16). For example, the user (10) may press a shortcut key on the form element where credentials are typically used, or on the webpage in general, drag and drop something onto the form, or all or a portion of the form may be highlighted or selected. The proxy server (16) or client device (12) may disable validation (the forcing of values to be filled out), by webpage modification, JavaScript™ scripting, etc. This would allow use of the "blanks for values" method described below for Stage 2. The proxy server (16) may provide to the client device (12) another interface allowing the user (10) to indicate a login is desired or to help specify what elements of the page relate to a login or what future action will indicate a login. The other interface can be another webpage in the same browser window, or another browser window, other software, a browser plug-in interface, or other inserted interfaces or JavaScript™ within the webpage, inserted by the proxy server (16), the browser plug-in, or other software on the client device (12).

Stage 2

In a second stage (stage 2 in FIG. 2, step 312 in FIG. 3A), the client device (12) indicates to the proxy server (16) that a credentialed login to the remote server (14) is required.

In one embodiment of the second stage, the client device (12) sends a request that is not sufficient by itself to login to the remote server (14) when received by the proxy server (16), and the proxy server (16) takes additional actions to complete the login request.

In one embodiment, the client device (12) upon transmitting the request to the proxy server (12) will transmit a placeholder value into a credential data field to be sent to the remote server (14), in step 312. For example, the placeholder may be "my password goes here". Where placeholders have been provided, the proxy server (16) will detect the placeholders, and will act to replace the placeholders with credentials before forwarding to the remote server (14) (steps 320 and 330 in FIG. 3A). Placeholder detection can be optimized by variations to lower the uniqueness, complexity, or consistency requirements, or to improve accuracy. For example, the proxy server (16) may use historic records of previously successful logins (317), utilizing out-of-band signals from the client device (12) or user (10), or by utilizing or parsing the webpage containing the login form or other sources of information about the request such as whether it was a password type of input which is masked, labels next to the input boxes on the login page, as well as the other factors listed in relation to determination of the risk of a user (10) using credentials on a remote system.

In an example where a placeholder is not used, the client device (12) may send additional information along with the request, which prompts the proxy server (16) to insert or append credentials elsewhere in the request. The additional information may be one or more additional fields, an HTTP header, one or more cookies, or other identifying information. The fields where credentials are typically located may have blanks for values, or any random value which is ignored, or may be missing from the request entirely.

The proxy server (16) may prompt the client device (12) to specify or confirm whether credential insertion is desired, and where credential insertion is required.

In an alternative out-of-band scenario, in advance of the login request, a signal is sent to the proxy server (16) indicating a login is about to occur, possibly specifying that the login is for a specific site or specific URL. When the proxy server (16) receives the next appropriate request from the client device (12), the appropriate credentials will be inserted. The advance signal may take the form of a specially formatted URL request (e.g., a special link was visited), or any alternate protocol.

In another alternative embodiment, the client device (12) may send a signal, inline or out-of-band, to the proxy server (16) that a login is requested. The signal has a minimal amount of information to identify that login is requested, for example, just the login form's URL. The proxy server (16) then obtains for itself from another source the remaining needed information to login. For example, the proxy server (16) may itself load the webpage with the login form, to inspect what elements the login form has. Alternatively, the proxy server (16) may run the site's JavaScript™ to see what additional parameters it would result in, or render the webpage with external software (e.g., a browser) and fill in the credentials in the interface to execute the command. It is possible that the proxy server (16) may examine historic data of previous logins to that site including the structure of the login page, successful responses from the remote servers (14) to credential usage, and unsuccessful responses particularly those that are identified as unsuccessful due to the presence of similar login page controls. In a further alternative, the proxy server (16) may look up a database storing known preselected sites and their login formats and/or structure (steps 317, 320 and 330 in FIG. 3A).

These methods may be varied or combined in different ways. The proxy server (16) may seek confirmation from the user (10) that login was intended or was successful. Furthermore, the method for a first login for a user (10) or a site may differ from subsequent logins as the proxy server (16) may now have access to historic information not available for a first login. Based on such historic information, the proxy server (16) may determine a target URI or data field of the remote server (14) to which the credential is to be sent, so that the credential can be selectively transmitted to that target URI or data field.

As described in further detail below, proxy server (16) may authenticate the user (10) or client device (12) to the proxy server (16), or confirm that a previous authentication has occurred, in step 315. In some embodiments, the proxy server (16) may provide a cookie to the client device (12), which may be used to confirm any prior authentication during subsequent requests. In other embodiments, the cookie may be provided before the authentication but not activated/honored by the proxy server (16) until after successful authentication.

Stage 3

In a third stage (stage 3A and 3B in FIG. 2), the proxy server (16) determines the credentials associated with the user (10) or client device (12) for the remote server (14).

In one embodiment, once the proxy server (16) has determined that a login is being requested and has determined the form of the login page, the proxy server (16) will determine the user credentials by looking them up in a database stored in the memory (20) (steps 320 and 330 in FIG. 3A). (Such credentials may have been previously created and stored in the database in accordance with the method for creation of an account requiring a credentialed access, as described below.) The database may be on the same or separate server as the proxy server (16), or may be accessed by way of an application programming interface (API) to the same or separate server.

In another embodiment, the credentials may be provided by the client device (12) in encrypted form, to be decrypted by the proxy server (16) as required. In one embodiment, double encrypted credentials may be provided to the client device (12) to be decrypted once using information to which the proxy server (16) does not have access and which prevents the proxy server (16) from decrypting the first time on its own. As the single encrypted credentials are not decryptable by the client device (12), they are provided back to the proxy server (16) for further decryption. In this manner, the client device (12) is required to use the credentials, but is restricted from accessing the credentials.

In another embodiment, the access request may be matched to the specific credentials required by the remote server (14) domain, e.g., "starts with" (match-header style) URL, regular expression (Regex) or by full URL matching.

In other embodiments, the choice of which credentials to retrieve may be also depend on other information provided by the client device (12), such as a specific username, where there may be multiple accounts or usernames available for the login.

In one embodiment, rather than looking up a record of credentials, the proxy server (16) may comprise a "Credential provider/generator" which would decrypt, process, or combine database records with information provided by the proxy server (16), the user (10), or the client device (12), or with a stored "salt or pepper" or "hardware-pepper", to discover what the credential is for the remote server (14) for use by the proxy server (16), but would not necessarily ever store the credentials in full.

Stage 4

Figure 2:
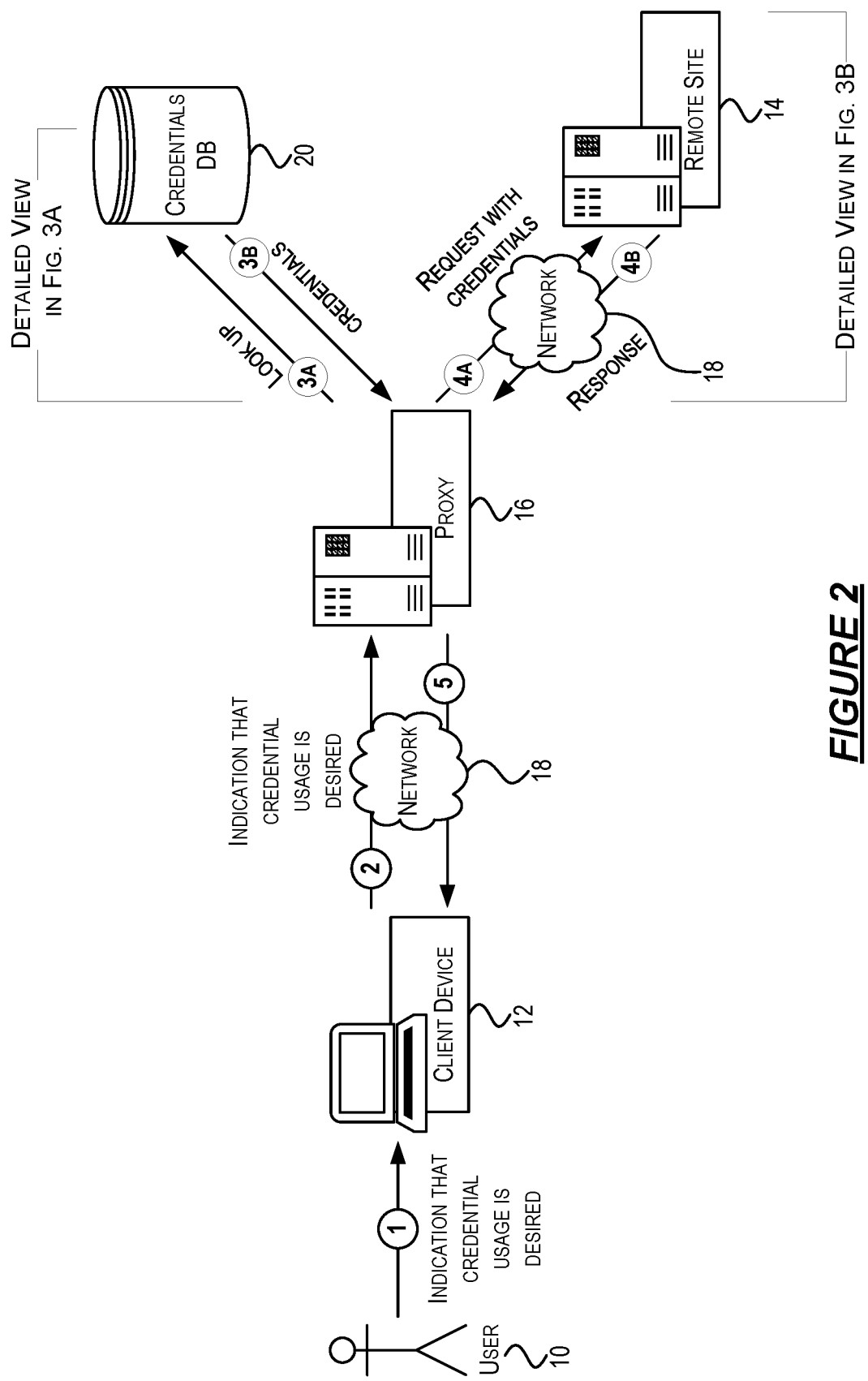
FIG. 2 shows a schematic representation of one embodiment of a method of the present invention.
Figure 3B:
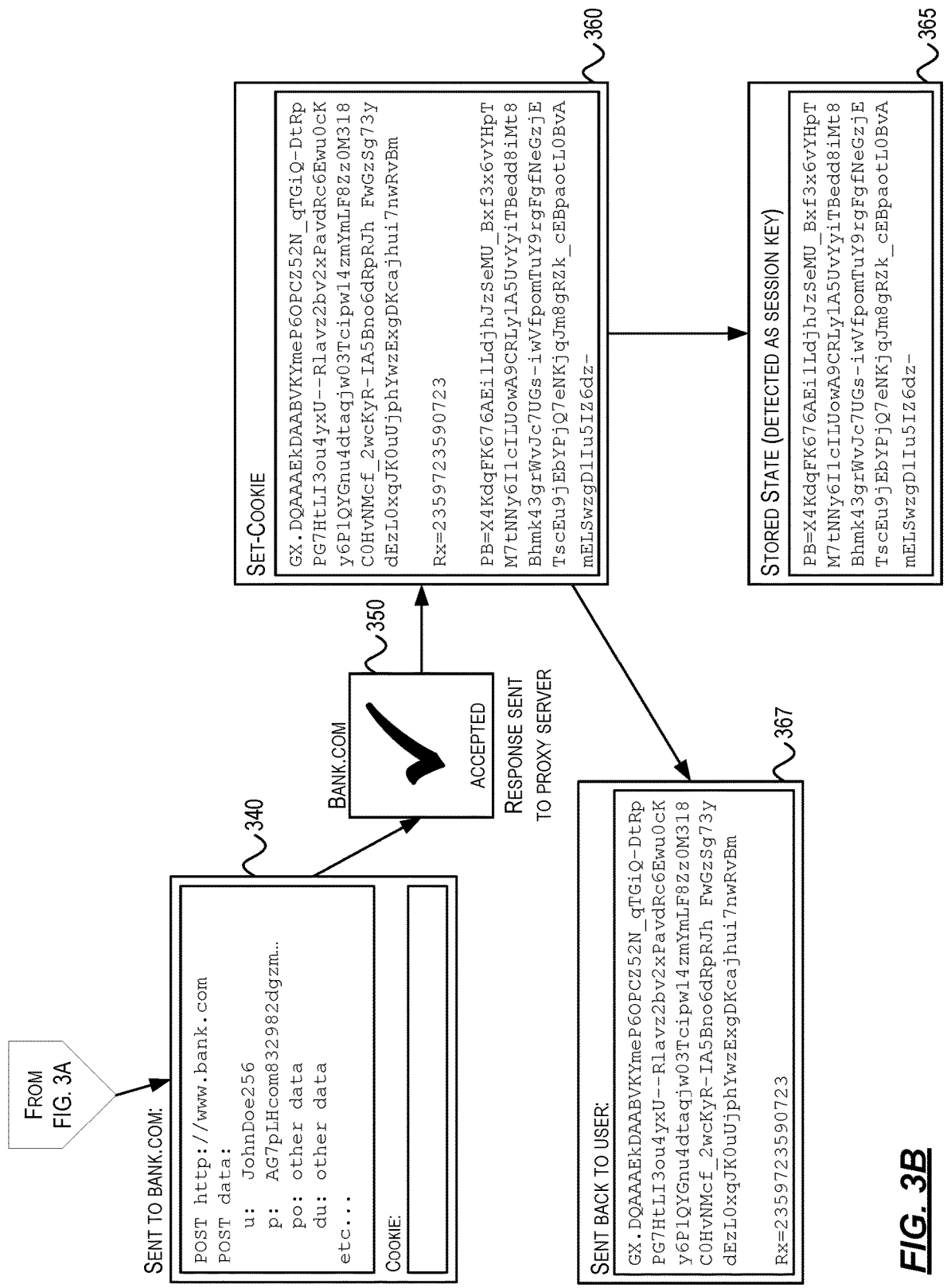
FIG. 3B shows a continuation of the embodiment of the method shown in FIG. 3A, where the proxy server uses the username and password from the credentials server to access the remote site.

Once the proxy server (16) has accessed the correct credentials for the remote server (14) requested, the proxy server (16) will then complete the login request by submitting the required credentials to the remote server (14) (stage 4A and 4B in FIG. 2; step 340 in FIG. 3B). This is done in a manner opaque to the client device (12), or which entirely restricts the client device (12), such that the user (10) cannot gain direct access to the credentials. In response to receiving the credentials, the remote server (14) permits the client device (12) to access resources on the remote server (14) via the communications network (18), either directly or mediated through the proxy server (16), in steps 350 and 360.

In one embodiment, a chained proxy server (16) residing partly on the client device (12) or the internet browser may be used to route requests, for efficiency or security reasons, to one of the proxy servers (16) not on the client device (12) or directly to the remote server (14). The determination of route rules may be obtained from a proxy server (16) not on the client device (12), from the user's preference or client device (12) settings, or dynamically as login intent is determined.

Stage 5

Proxy server (16), in step 360, may restrict access to the client device (12) from credentials or session secrets comprised by the remote server's (14) response. The proxy server (16), in step 365, may store the session secrets. Subsequent requests for access to the remote server (14) from the user (10) would have the session secrets reinstated before forwarding the request to the remote server (14).

Once the proxy server (16) has removed the session secrets from the remote server (14) response, the proxy server (16) will then complete the login request by forwarding the modified response to the client device (12) (stage 5 in FIG. 2; step 367 in FIG. 3B).

Method for Proxy Login

Figure 7A:
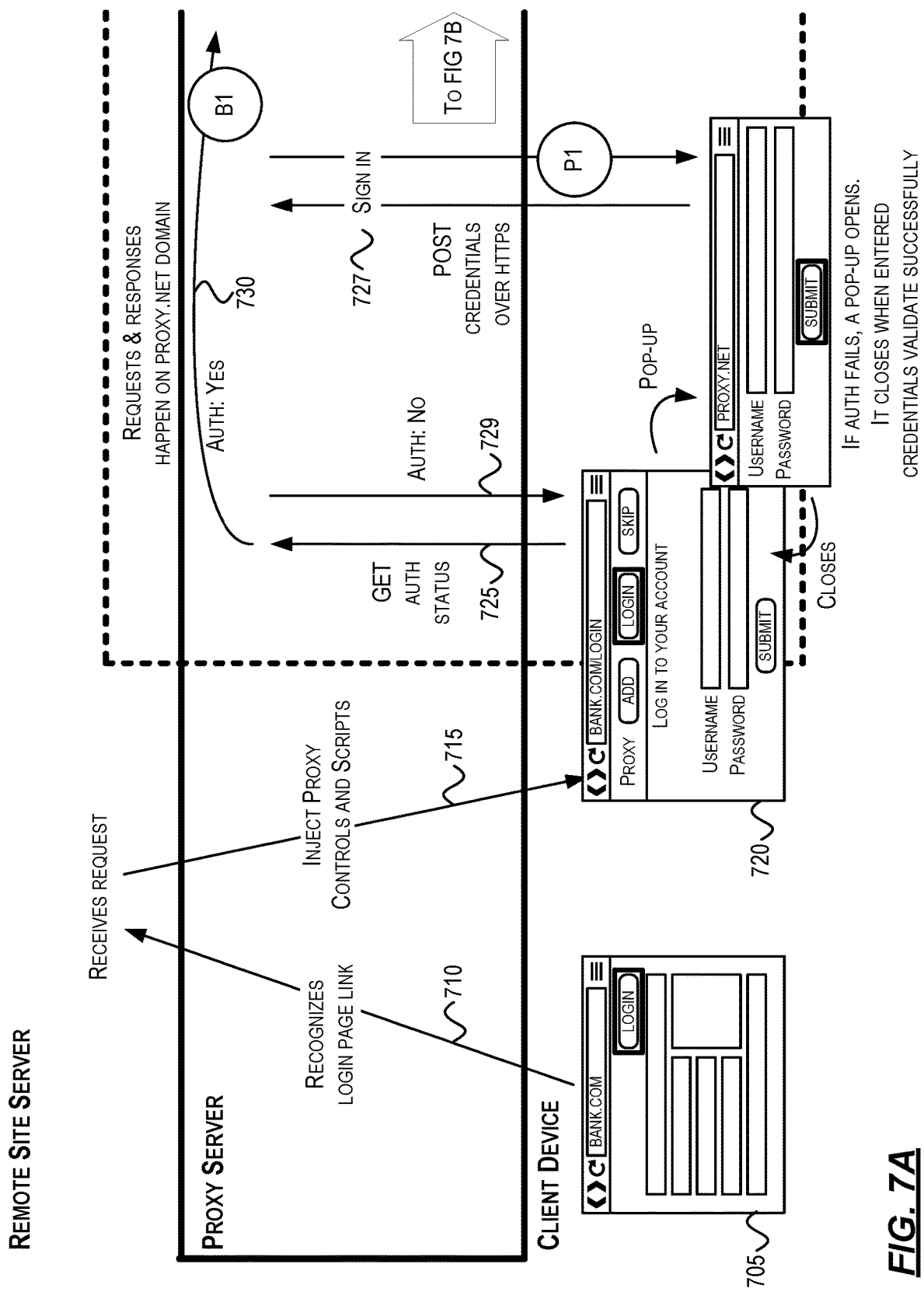
FIG. 7A shows a first part of a schematic representation of one embodiment of a method of the present invention, for proxy login.
Figure 7B:
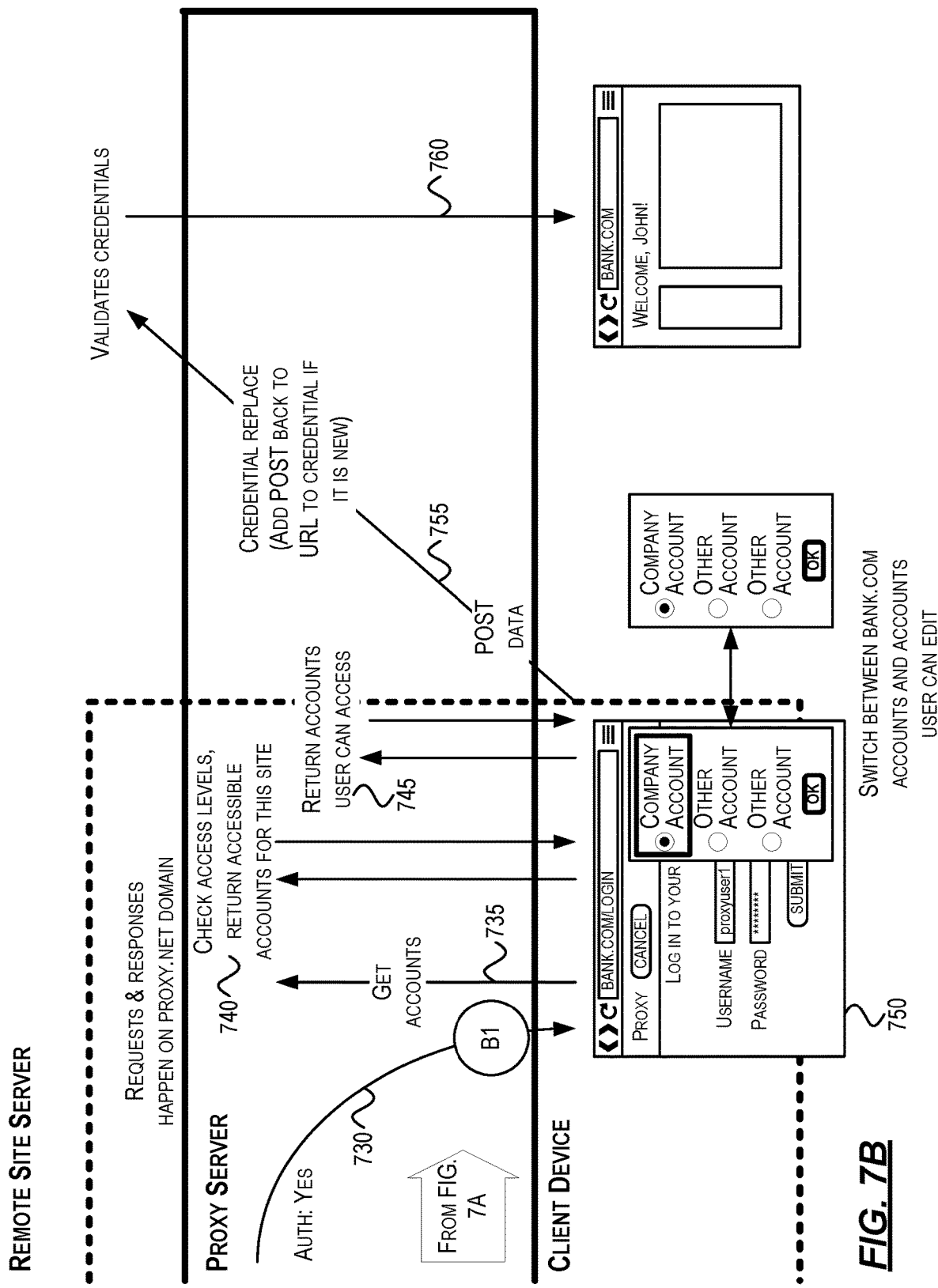
FIG. 7B shows a second part of a schematic representation of one embodiment of a method of the present invention, for proxy login.

FIG. 7A and FIG. 7B illustrate steps performed for a proxy login in accordance with one or more illustrative aspects described herein. A user (10) may initiate a login request to a remote server (14) from a client device (12). For example, the user (10), in step 705, may click on a link associated with a "Login" button. In response, the proxy server (16) may receive, in step 710, the request and determine that the request comprises a login request. In step 715, the proxy server (16) may receive the response to the login request from the remote server (14) and inject proxy controls and scripts into the response prior to forwarding the response to the client device (12). The injected proxy controls and scripts may cause the client device (12) to display additional user interface elements to assist the user (10) in the login process.

The user (10) may continue the login process by clicking on the "Login" button as shown in step 720. The proxy controls and scripts may communicate, in step 725, with the "proxy system domain" or "PSD" to determine the authentication status for user (10). If or when the user (10) is not authenticated to the PSD, in step 729, the proxy controls and scripts may prompt the user (10) for authentication credentials to the proxy server (14). For example, the proxy controls and scripts may cause display of a pop-up dialog requesting a username and password. The proxy controls and scripts may attempt to obtain authentication of user (10) by sending the provided credentials to the PSD, in step 727. Step 727 may be repeated until user (10) is authenticated. Once authenticated, the PSD may provide the remote server (14) domain's cookie (P1) to the client device (12).

Discussion will now turn to FIG. 7B. In step 730, the PSD sends a cookie (B1) identifying the client device (12) (or user (10)) to the remote server (14). As the cookie (B1) does not originate from the remote server (14) site and is not required by the remote server (14), the format of the cookie (B1) may be consistent across unrelated site domains. However, preferably, it differs across unrelated remote server (14) domains to make it difficult to predict or calculate the cookie for one remote server (14) domain based on another remote server (14) domain's cookie. The proxy server (16) will then remove the cookie (B1) before forwarding the login request to the remote server (14).

Once the proxy server (16) has accessed the correct credentials for the remote server (14) requested, the proxy server (16) will then complete the login request by submitting the required credentials to the remote server (14), in step 755. This is done in a manner opaque to the client device (12), or which entirely restricts the client device (12), such that the user (10) cannot gain direct access to the credentials. In response to receiving the credentials, the remote server (14) permits the client device (12) to access resources on the remote server (14), either directly or mediated through the proxy server (16), in step 760.

In step 735, the proxy controls and scripts may communicate with the proxy server (16) to request and receive the accounts associated with the remote server (14). In step 740, the proxy controls and scripts may communicate with the proxy server (16) to request and receive the access levels associated with user (10) and client device (12) and determine the accounts associated with the remote server (14), from step 735, to which user (10) and client device (12) have access. In step 645, the proxy server (16) may provide client device (12) with a list of accounts that user (10) may use to log into remote server (14). As shown in step 750, the client device may prompt the user (10) to choose an account from the list of available accounts.

Once the proxy server (16) has accessed the correct credentials for the remote server (14) requested, the proxy server (16) will then complete the login request by submitting the required credentials to the remote server (14), in step 755. This is done in a manner opaque to the client device (12), or which entirely restricts the client device (12), such that the user (10) cannot gain direct access to the credentials. In response to receiving the credentials, the remote server (14) permits the client device (12) to access resources on the remote server (14), either directly or mediated through the proxy server (16), in step 760.

Method for Protection of Credentials and Portions of Remote Servers

In another aspect, the present invention provides a method for protecting credentials in one or a combination of the following ways.

In one embodiment, the proxy server (16) may detect and block activity that compromises or changes the credentials. The proxy may filter data from the remote service to ensure the credentials are never provided back to the user. The user may only see the placeholder, or a blank, or hidden or random text.

In one embodiment, the proxy server (16) or a connected system may periodically, on a scheduled or random basis, after a session ends, or after suspicious or select activity, login automatically and independently to the remote server (14) to confirm that the credentials have not been changed by the user (10) or client device (12), or that the data, such as URLs, for the login are still allowing successful use of the credentials. Alternatively, the automated logins may be used to check if the remote server (14) site has changed in a way that poses a security risk or if there is a need to update settings on the proxy server (16) for the remote server (16) site. In relation to restricting the client device's (12) access to credentials or session secrets, the proxy server (16) may implement a real-time approval process, such as with manual approvals provided by an administrator or a user (10) with a high level of authority. In the interim, the requesting user (10) may simply be delayed (e.g., server appears slow to respond) or they would get redirected to a page to indicate that the request is waiting for approval.

In one embodiment, the proxy server (16) may monitor email traffic or other out-of-band communication streams for notifications or warnings that any credential for a remote server (14) site has changed. For example, emails that have in the body keywords such as "Change Password Confirmation" or the like may be monitored and cause alerts to be posted or communicated within the system.

If the proxy server (16) detects that the credentials have changed, or that the usage of the credentials is in some way different from historic usage, the proxy server (16) may warn an administrator of the proxy server (16) or of the remote server (14), or the user (10) of the client device (12) because these changes could indicate an attempt to access the credential by a user (10) or another person who is not authorized to access the credentials. Based on such historic information, the proxy server (16) may determine a target URI or data field of the remote server (14) to which the credential is to be sent, so that the credential can be selectively transmitted to that target URI or data field, or so that access of the client device (12) may be restricted to a select portion of the remote server (14).

The security techniques used here may prevent malicious activity as well as accidental misuse of credentials. In one embodiment, the determination of risk or legitimacy of the user (10) using or changing particular credentials on remote system can involve the recognition of URLs such as that of the login page or the login form submission, or their matching to regular expression (regex) statements or other pattern matching systems. For example, where the credentials are to be submitted to a remote server (14) form having a specific URL or URI, the proxy server (16) may selectively limit providing the credentials only to that URL or URI, or a URL or URI referenced as part of the form. In other embodiments, other characteristics which may influence risk assessment include the name of the elements for which the credentials are to be provided, (e.g. "UserPwd") or the characteristics of the other fields or elements used together with the credentials request. For example, "RememberMe-Checkbox" or "Input type=:password" fields would indicate a higher likelihood of valid credential usage. Fields such as "Subject" or "Body" would indicate a lower likelihood of valid credential usage as it suggests a message posting is desired instead. Labels next to the input boxes on the login page may be considered. For example, "Please Type Your Password Here" has keywords and structure that suggests valid usage. Based on the evaluation of such information (e.g.: a URI or data field name; a URI or data field reference; the number of URIs or data fields; a URI or data field length; a URI or data field display characteristic), the proxy server (16) may determine a target URI or data field to which the credential is to be transmitted, and may restrict access of the client device (12) to a select portion of the remote server (14).

In still other embodiments, other factors such as the elapsed time since last successful usage of the credential may be considered. For example, a long elapsed time implies the larger likelihood that the remote server (14) site has changed recently. Other factors related to the user (10) that indicate risk level may include the type or identity of the client device (12), which network is being used, a location of user (10) or client device (12), authorization or trust level of the user (10) or client device (12), and the like.

Another factor may be the effect of the usage after it has occurred. For example, if the credentials were sent back as part of the response, this suggests it was likely not a password field and was more likely to be a message composition which is now being previewed after posting.

Another factor may be the value of the remote server (14), as rated in advance manually by trusted users or automatically based on categories of sites from a third-party database or from automatic detection based on keywords and data structure. For example, the presence of a table of dollar values or words such as "account balance" may indicate a financial services website.

Another factor which may be considered is whether the request is a Get or a Post HTTP request.

In one embodiment, the proxy server (16) may determine the risk or legitimacy of the user (10) performing general activities or activation activities on the account, even if they do not involve the credentials, using the same methods and factors mentioned for determination of the risk of using credentials. Examples of activation activities on the remote server (14) site include adding OAuth protocol accounts, adding or obtaining API keys, having the site send invites to additional users, confirming acceptance of additional users obtaining access, or adding of new authentication methods that can bypass the need for credentials such as a cell-phone number for forgotten password resets.

In one embodiment, the proxy server (16) may consider the historic use, trends, and the difference as compared to the current use of the remote server (14) site to aid in determination of risks based on the current user (10) or other user(s) (10). Based on such historic information, the proxy server (16) may determine a target URI or data field of the remote server (14) to which the credential is to be sent, so that the credential can be selectively transmitted to that target URI or data field, or so that access of the client device (12) can be restricted to a select portion of the remote server (14).

In one embodiment, the proxy server (16) may filter any response from the remote server (14) so credentials or other offending data are never provided back to the user (10) or filtering the request from reaching the remote server (14).

The offending data may be replaced with a placeholder or a blank, depending on the location of the credential (JavaScript or an input field). Alternatively, the entire page may be blocked from the user (10), showing an error page or redirecting to an explanatory page. The event may be recorded including related information such as the raw request, any relevant URLs, the response from the remote server (14), or a graphical snapshot (screenshot) of the response as rendered on the proxy server (16). As an example, a remote server (14) may receive a request in a form displayed on an Internet browser that includes a password credential and other information. Ordinarily, if the other information is missing or erroneous, the remote server (14) may transmit the form back to the client device (12) containing a submitted password credential. In the present invention, however, the proxy server (16) will filter the password credential from the form before it is transmitted to the client device (12), thereby maintaining the restriction of the password credential from the client device (12).

Method for Persistent Authentication Across Multiple Remote Servers

Authenticated proxies or proxies that request username and password upon connection have inconsistent support across different platforms. In the present invention, a method is provided to identify that a user (10) using an Internet browser to access a remote server (14) site via the proxy server (16) is authorized to do so, but the user's (10) browser keeps all cookies, etc. separate for each domain. For example, if the proxy server (16) sets a cookie on <proxy>.com, the browser will not send it back for requests by a remote server (14) site "<google>.com", typically making it impossible to identify the user (10). It is not sufficient to use IP addresses, which cannot be trusted and are often shared, such as when client devices (12) communicate through WiFi hotspots. The present methods are not browser-specific, meaning any functional browser may be used on the client device (12) to communicate and authenticate to the proxy server (16). It is noted that cookies may be restricted to domains, sub-domains, or to specific paths within a domain in the case of multiple applications on the same domain, but for simplicity in explanation, the below embodiments use domains as an example. The authentication to the proxy server (16) can be for all remote server (14) sites or some remote server (14) sites and may be time limited with different time limits for different remote server (14) sites.

Figure 4B:
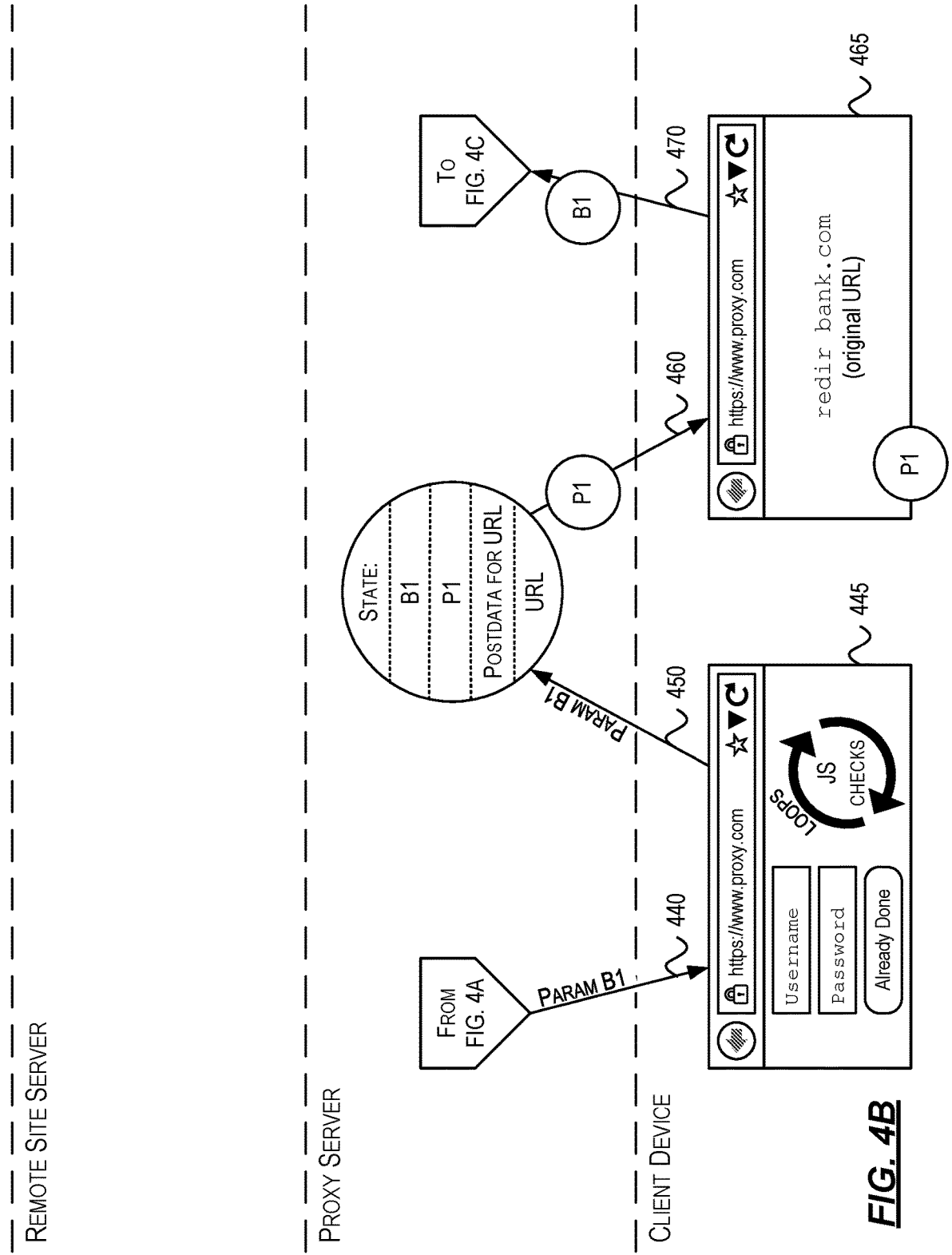
FIG. 4B shows a continuation of the embodiment of the method shown in FIG. 4A, where the user is authenticated by the proxy server and redirected back to the remote site.
Figure 4C:
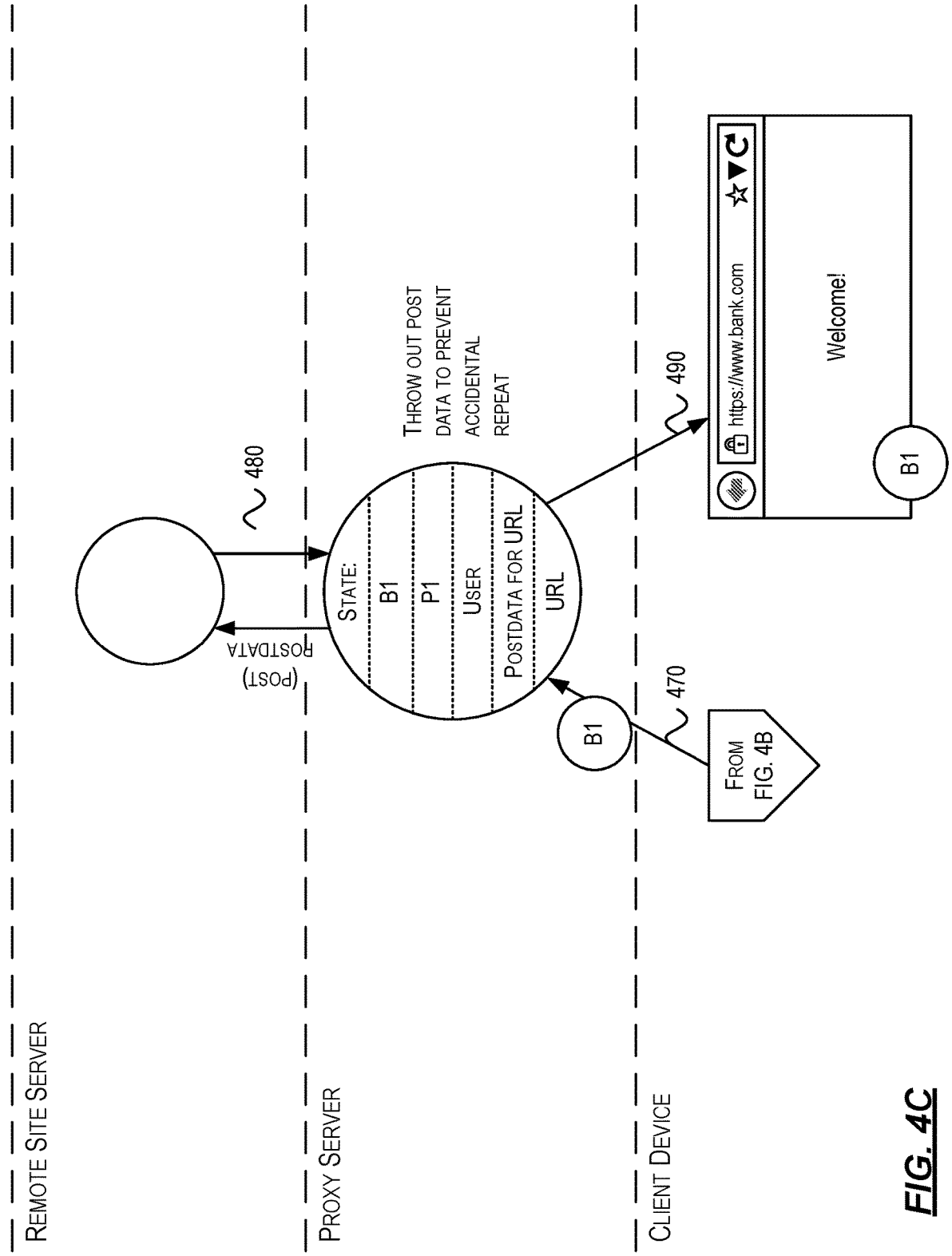
FIG. 4C shows a continuation of the embodiment of the method shown in FIG. 4B, where the authentication data from the proxy server is passed to the remote site to authenticate the user.

In one embodiment, a cookie system is used for authentication, as shown schematically in FIG. 4A, FIG. 4B, and FIG. 4C. The browser on the client device (12) stores cookies for each remote server (14) domain visited, to authenticate into the proxy server (16), but not the remote server (14) domain itself. If the proxy server (16) gets a request to access a remote server (14) site, for which no cookie has been provided by the client device (12), as shown in step 410, the proxy server (16), in step 420, redirects to a reserved domain (e.g., proxy.com) where the browser then sends an authentication cookie. The proxy server (16) then "passes along" the authentication to that remote server (14) domain via additional redirects which include headers that install domain-specific cookies on the client device, in step 480. Subsequent requests for that remote server (14) domain are recognized as allowed to use the proxy server (16) to access content, as shown in step 490.

In one example, when the client device (12) sends a request for accessing a remote server (14), in step 410, the proxy server (16) checks if the request contains a cookie (B1) identifying the client device (12) (or user (10)) to the remote server (14). As the cookie (B1) does not originate from the remote server (14) site and is not required by the remote server (14), the format of the cookie (B1) may be consistent across unrelated site domains. However, preferably, it differs across unrelated remote server (14) domains to make it difficult to predict or calculate the cookie for one remote server (14) domain based on another remote server (14) domain's cookie. The proxy server (16) will then remove the cookie (B1) before forwarding the login request to the remote server (14).

The cookie (B1) is then provided to the client device (12) by the proxy server (16), in step 420, either by insertion of a cookie (B1) into a response sent from the remote server (14) to the client device (12) either using a header or injecting a script to save the cookie (B1), or by the proxy server (16) inserting a cookie (B1) into a redirect response (425) provided by the proxy server (16). Alternatively, the cookie (B1) may be inserted into requests to many unrelated remote servers (14) by a browser plug-in or custom software on the client device (12).

Discussion will now turn to FIG. 4B. If a cookie (B1) is not present in the request for a particular remote server (14) domain, the proxy server (16) may respond with a redirect (425) to a domain, referred to herein as the "proxy system domain" or "PSD", that authenticates the user (10) or client device (12) to the proxy server (16), or confirms that a previous authentication has occurred, in steps 430 and 440. The PSD would then redirect the client device (12) back to the originally requested remote server (14). The proxy server (16) may store the URL for the originally requested remote server (14) domain and, if applicable, post data of the request, before redirecting to the PSD in step 440. In this way, the proxy server (16) can redirect back to the correct original URL, in steps 460, 465, and 470, in a case of multiple requests, and the proxy server (16) can proceed to forward the original request's post data to the remote server (14), in step 480. In step 445, JavaScript™ may also be used to detect that a cookie is not present for a particular remote server (14) domain and then cause a request 450 within a separate tab, window, or within AJAX to the PSD.

A cookie (B1) is provided to the client device (12) for the PSD, which is used to confirm any prior authentication during subsequent requests that redirect to the PSD. The cookie (B1) is either provided to the client device (12) after successful authentication on the PSD, or provided before the authentication but not activated/honored on the proxy server (16) until after successful authentication.

The redirect 450 from the remote server (14) domain to the PSD may include information to identify the remote server (14) domain's cookie (P1) within the PSD URL, so that the proxy server (16) can associate authentication on the PSD to that remote server (14) domain's cookie and to access requests for that remote server (14) domain from that client device (12). Alternatively, redirection from a remote server (14) domain to the PSD is done via a response to the request containing an HTML form or script that creates a new post request to the PSD, containing the information to identify the remote server (14) domain's cookie (P1), so the proxy server (16) can associate authentication on the PSD to the remote server (14) domain's cookie (P1) and therefore to associate requests for remote server (14) domain with that client device (12).

In one embodiment, to reduce the number of redirects, the cookie may be inserted using cross-domain requests. For example, a JavaScript™ on a page of the PSD may cause the client device (12) to send a request to the remote server (14) or JavaScript™ on a modified page from the remote server 445 may cause the client device (12) to send a request, in step 450, to the proxy server (16) via PSD, where such requests may cause cookies to be set. In some cases, the proxy server (16) intercepts the requests and responses between the client device (12) and remote server (14) to either modify them, or respond to them in place of the remote server (14), to permit cross-domain requests. For example, "origin" headers in the request may be modified or "Access-Control-Allow-Origin" responses may be generated by the proxy server (16) and sent back to the client device (12).

In one embodiment, detection of credential usage may result in the opening of a separate interface, such as popup window or separate tab, for the user (10) using client device (12) to complete the authentication to the proxy server (16). Upon successfully authenticating, the user (10) is returned to the original interface where credentials are used, at which point the form using the credentials is automatically submitted. In some cases, this may be a result of detection that the credential usage involves technologies that break on redirect (for example, AJAX). Such detection can involve parsing or analyzing URLs, form pages from the remote server (14), names of form elements, or script code such as JavaScript™.

The proxy server (16) may compare the remote server (14) URL requested by the client device (12) to a list of URLs, URL patterns, or URL segments, in order to determine when authentication to the proxy server (16) is required, rather than requiring authentication for all requests through the proxy server (16). Authentication to the proxy server (16) may be based on a one-time code as provided to another user (10) or another client device (12), whereby the new client device (12) or user (10) being authenticated would gain access of the same degree and scope or a subset as compared to the user (10) or client device (12) providing the one-time code, which is ultimately based on the providing client device's (12) earlier authentication. Such authentication can be chained or restricted from being chained further. In this way, an untrusted client device (12) can be controlled from a more trusted one. For example, an employee can issue a one-time code to an untrusted demo machine client device (12) that would gain access to only one particular remote server (14) for a brief period of time, but would not be able to access anything else, without being required to authenticate itself in the usual way that the employee did.

Authentication to the proxy server (16) may be done using standard username/password combinations, and/or involve two-factor authentication such as fingerprints, other biometric authentications, one-time codes which are sent out-of-band to the user, or involve integration with Active Directory™ domain logins.

The point at which first authentication, or additional authentication, may be related to the detection of credential usage being desired, but may also be based on visiting a remote server (14) URL that, when matched to URLs known to the proxy server (16) or credentials provider using pattern based matching such "starts with" (match-header style) URL, regular expression (regex) or by full URL matching, indicates that an authentication is required. For example, this can be for security to access portions of the remote server (14) that may remember the user (10) or client device (12) by external means such as IP address and thereby need to be restricted. In another example, the remote server (14) could break due to redirects during credential usage and the authentication may need to happen upon visiting the login form or even upon the first page requested from the remote server (14).

Method for Creation or Modification of an Account Requiring a Credentialed Access If a user (10) attempts to access a remote server (14) site which requires an account and login credentials for the first time, it will be necessary to implement procedures to create a new account for the organization and generate those credentials. The process must still prevent user (10) from accessing the credentials which are being created. Some of the techniques described above are relevant here. For example, it is necessary to disable validation on the page provided by the remote server (14) for account creation, or to modify the page's script to allow blanks for the new password field.

Figure 5A:
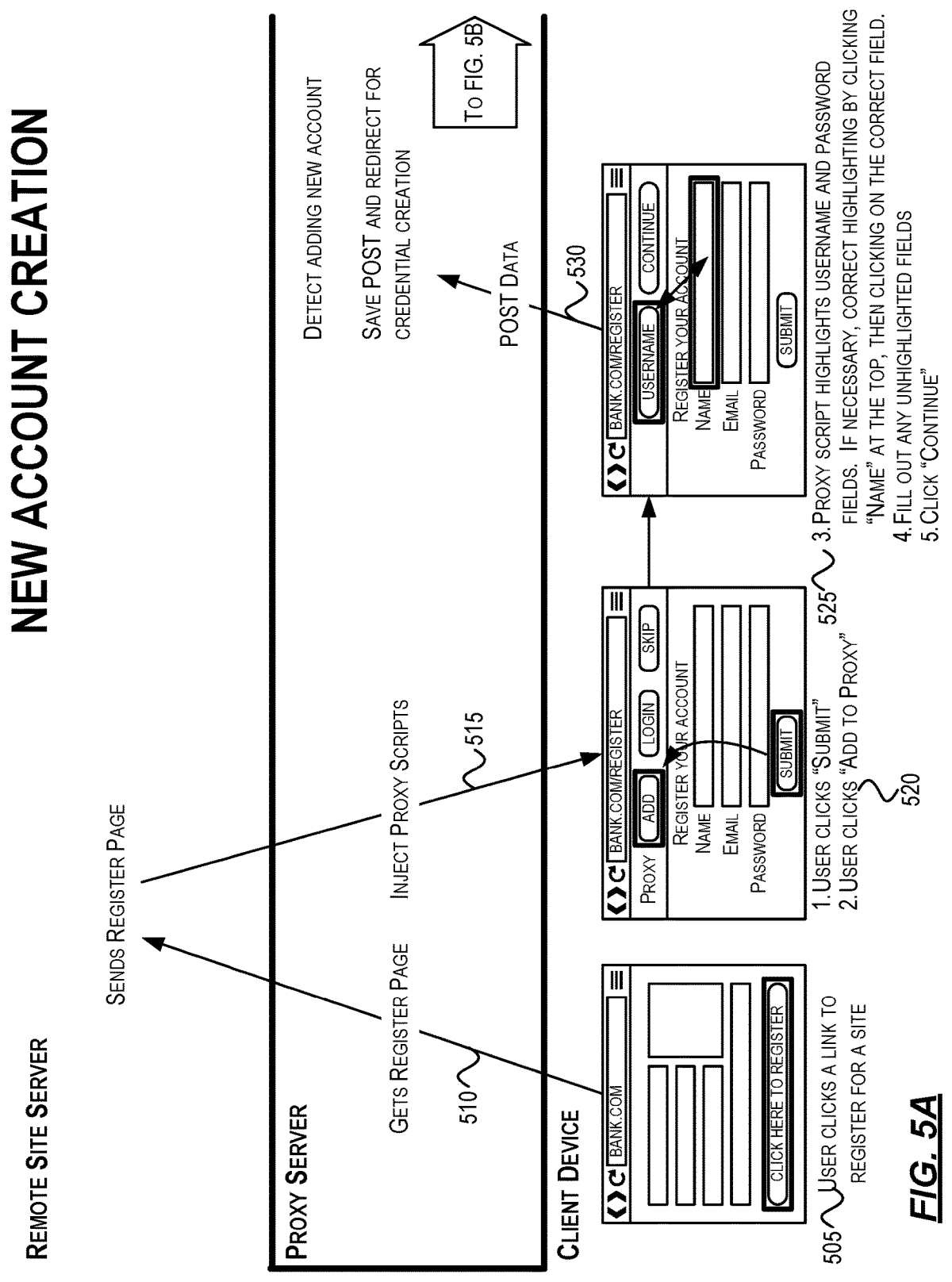

Referring to FIG. 5A, the user (10) may attempt to access the registration page for a remote server (14) by clicking on a link to register for the site, as shown in step 505. The proxy server (16), in step 510, may forward the request to the remote server (14). In step 515, the proxy server (16) may receive the registration page and insert proxy scripts into the content of the page. The proxy scripts may cause the client device (12) to display additional user interface elements along with the registration page to assist the user (10) in the new account creation process.

In step 520, the user (10) may indicate a desire to continue the new account creation process. For example, the user (10) may click on the "Submit" button and the "Add to Proxy" button added by the proxy scripts. The proxy server (16) may analyze the registration page, in step 525, to determine the fields that may require credential insertion. Alternatively or additionally, the proxy scripts, in step 525, may prompt the user (10) to specify whether credential insertion is desired, and where credential insertion is required.

Figure 5B:
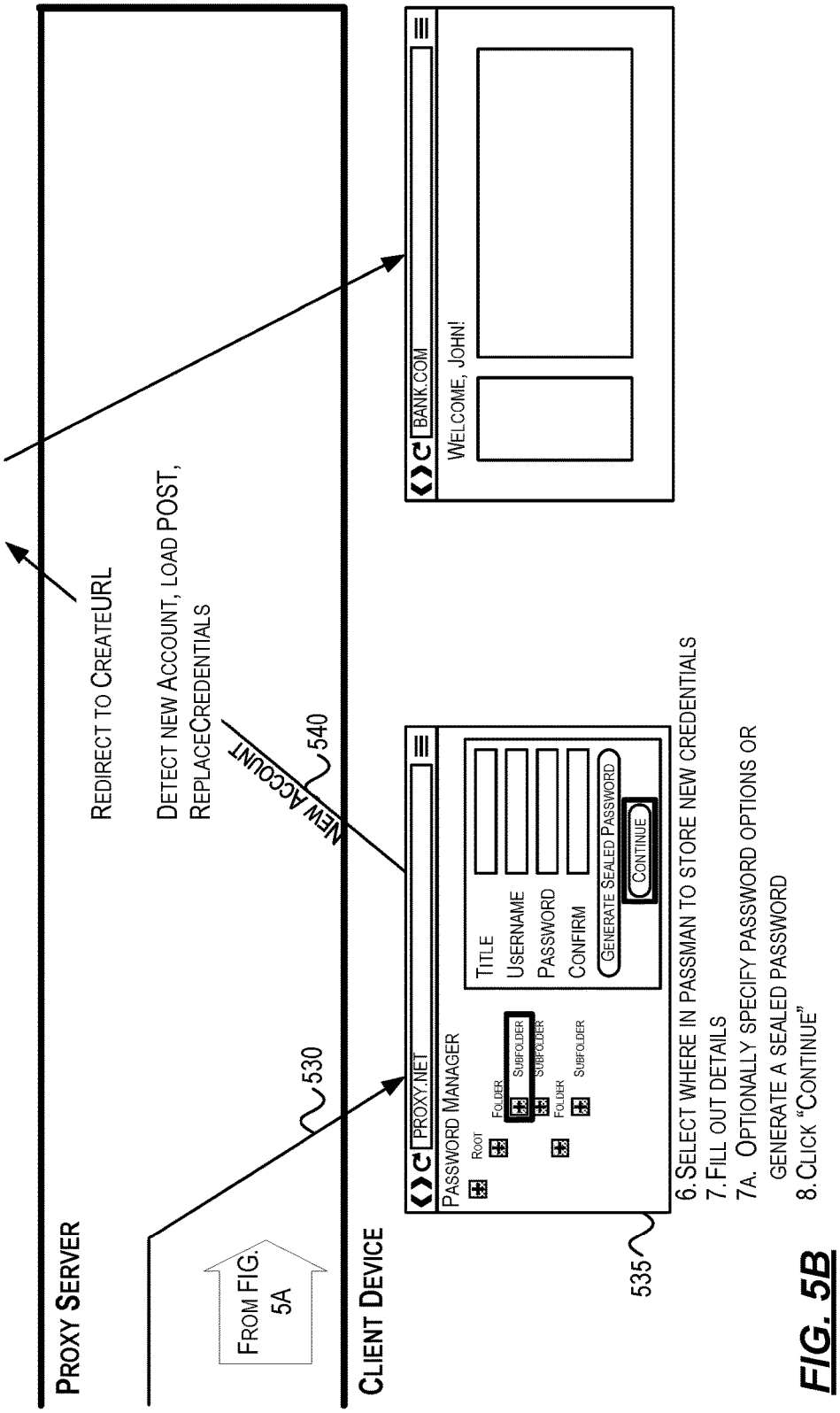
FIG. 5B shows a continuation of the embodiment of the method shown in FIG. 5A wherein the proxy server stores the new account credentials and redirects the user to the remote site.

Referring to FIG. 5B, which follows after step 520 of FIG. 5A, in step 530, the proxy server (16) may receive the request for adding a new account. The request may comprise post data that may be saved by the proxy server (16). As described in further detail above, the proxy server (16), in step 530, may redirect the client device (12) to a proxy system domain (PSD) for authentication and credential creation. In addition, the proxy system domain may request additional information corresponding to the new account, as shown in step 535. The PSD may then redirect, in step 540, the client device back to the remote server (14) after authentication and credential creation is completed.

In one embodiment, the user (10) may provide a credential input, in step 535, such as a text string in the password field for the new account for the proxy server (16), with a pattern or format which indicates to the proxy server (16) the type of password to create. For example, an alphanumeric pattern such as "111AAA@" would signal that the proxy server (16) should generate a password that is compatible with that format such as "532BdC!" The expression format can be similar to what is popularly used in Regex, potentially with modifications that would allow it to be provided via the password input control to the proxy server (16) and not trigger any validation rejections on the page (i.e., some controls will not allow reserved characters in the password field). Alternatively, the user (10) may input a combination of a reserved placeholder value together with a pattern, or a placeholder alone. A placeholder may be chosen from a list of predefined placeholders that indicate specific formats to generate (e.g., "nosymbols" or "verylong@" or "shortlotsofsym@@@"), which the proxy server (16) would use to detect how and where to use credentials, but would also indicate the format of the new password to use. Alternatively, the user (10) may specify or select rules regarding the length of the credential, character set allowed, or regex rules, in the password field or out-of-band.

In one embodiment, the proxy server (16) may analyze or execute the login page and associated scripts provided by the remote server (14); to determine what format of password the page is likely to accept (step 540). For example, a JavaScript™ validation function provided by the remote server (14) may be executed repeatedly within a sandbox on the proxy server (16) with various attempts at preferred password examples, until the validation function indicates the password format would be accepted by the remote server (14) site.

Figure 6A:
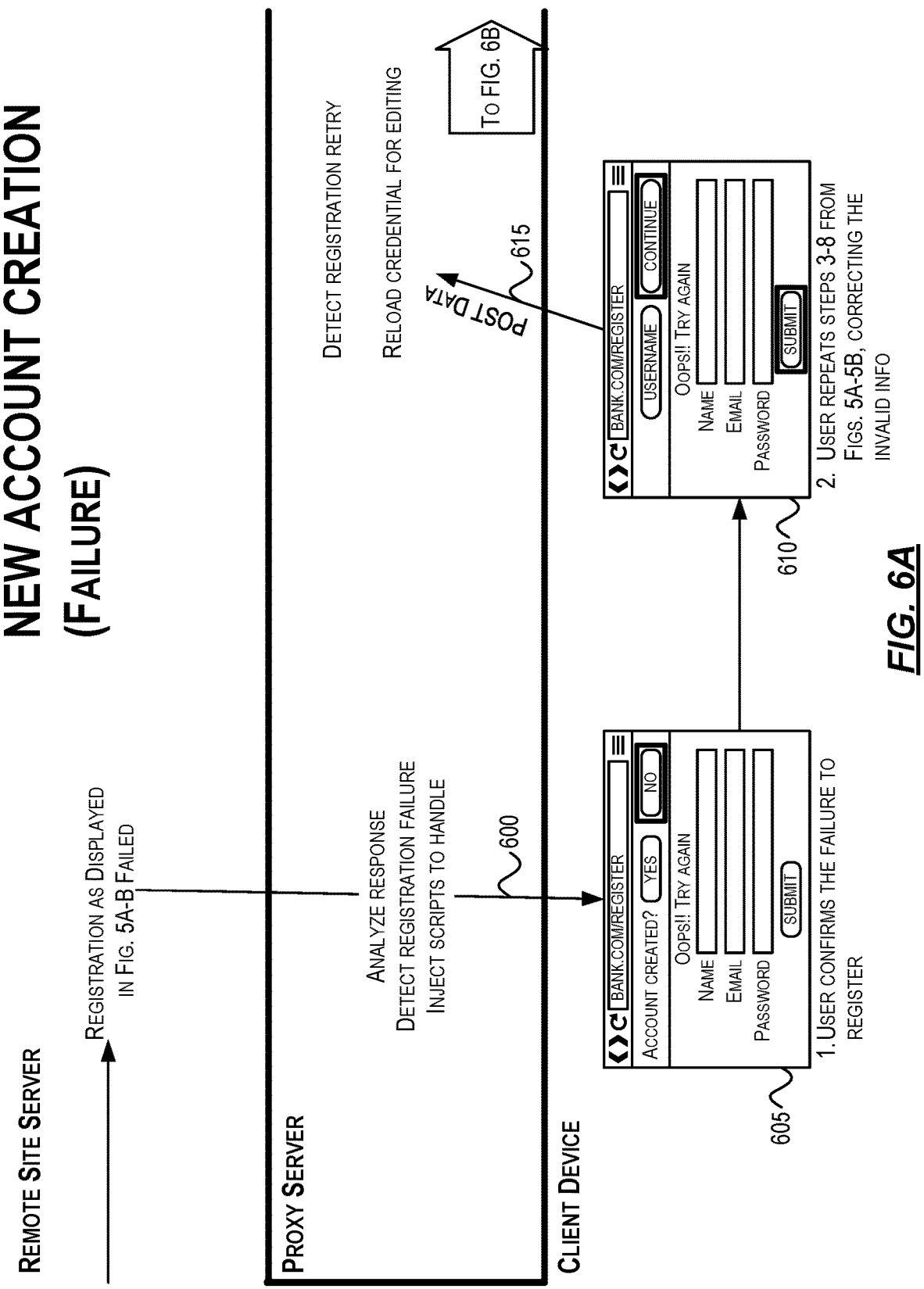
FIG. 6A shows a schematic representation of one embodiment of a method of the present invention where the new account information is not sent to the proxy server when the new account creation fails.
Figure 6B:
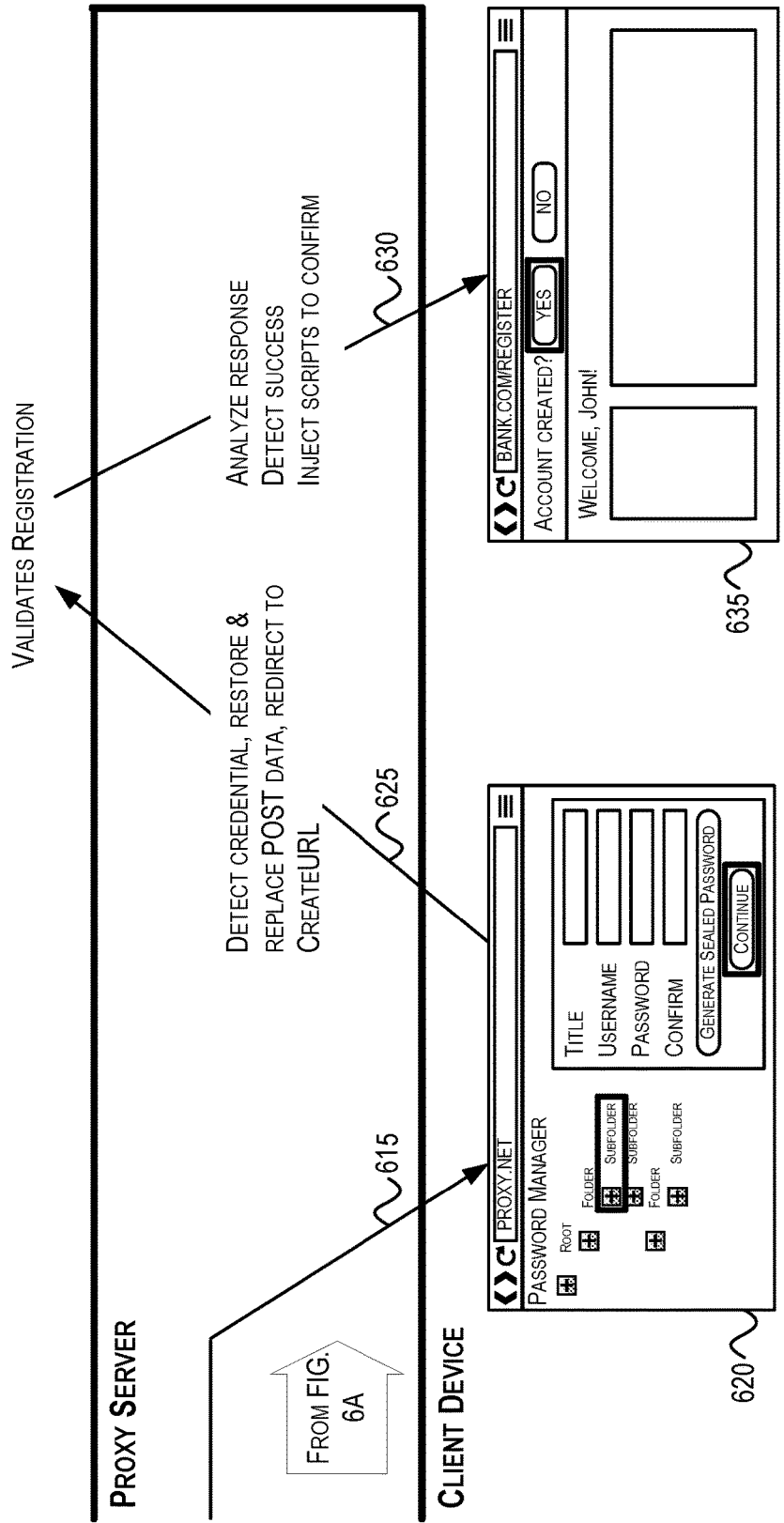
FIG. 6B shows a continuation of the embodiment of the method shown in FIG. 6A wherein the account creation data is only sent to the proxy server after a successful new account creation.

In one embodiment, the proxy server (16) may detect that the remote server (14) site did not accept the credential creation or modification request and may take a variety of actions such as responding by showing an interface to modify the parameters of the request to try again, as illustrated in FIG. 6A and FIG. 6B.

In step 600, the proxy server (16) may detect that registration failed and inject proxy scripts into the response from the remote server (14) to handle the registration failure. In step 605, the user (10) may be prompted to confirm that account registration failed. As shown in step 610, the user (10) may be prompted to specify whether credential insertion is desired, and where credential insertion is required. In step 615, the proxy server (16) may receive the request with updated account information. The request may comprise post data that may be saved by the proxy server (16). As described in further detail above, the proxy server (16), in step 530, may redirect the client device (12) to a proxy system domain (PSD) for authentication and credential creation. In addition, the proxy system domain may request updates to information corresponding to the account, as shown in step 620. The PSD may then redirect, in step 625, the client device back to the remote server (14) after authentication and credential creation is completed. In step 630, the proxy server (16) may analyze the response from remote server (14) to determine whether account registration was successful. Additionally or alternatively, the proxy server (16) may further inject proxy scripts to prompt the user (10), in step 635, whether account registration was successful.

In one embodiment, the proxy server (16) may insert JavaScript™ into the page provided by the remote server (14), to provide an indicator or selector of credential format entropy or strength.

Out-of-band solutions, similar to those described above, may be used in new account creation. For example, the proxy server (16) may receive an out-of-band signal from the user (10) in advance of a new account being created via an upcoming visit to a particular remote server (14) or particular URL. The out-of-band signal may involve creating a credential record that is partially complete (e.g., where the password is blank, the password is a reserved value, or where the credential record is flagged as incomplete). Upon detection of an attempt to use the credential, the proxy server (16) will know that a new account is being created and that the credentials provided to the remote server (14) are to be decided, possibly within a format restriction, rather than recited from record. Alternatively, the out-of-band signal may involve creating a credential record that is fully complete, where the credentials are created but never shown to the user (10). Usage during account creation would be the same as credential usage described above.

In one embodiment, the credential record may be flagged as "new", disabling restrictions that would otherwise disallow using the credentials on a page that is intended for new account creation. For example, the proxy server (16) may allow credential usage on URLs that are not a login URL, or allow credential usage twice on the same page (because new account creation typically involves typing in a password twice), or allow credential usage on a page that otherwise would violate rules intended to block password resets.

The proxy server (16) may potentially flag the credential record as "never seen by user" ("sealed"), to indicate that the new record had automatically generated credentials that the user never had access to, rather than manually specified credentials.

As described above, the proxy server (16) may respond to a new account creation or account credential modification request by a redirect to authenticate the user to the proxy server (16), such as a redirect to a PSD. The proxy server (16) may respond to an account creation request by a redirect or a page for the user (10) to confirm that a new account is desired or provide additional information such as the identity of other users (10) who should have access, where the credential record should be stored, the format specifications to use for generating the credential records, or the like.

In one embodiment, the proxy server (16) may evaluate rules to determine who is able to create new credentials and determine if the additional information (such as what other users should have access) is allowed. The proxy server (16) may introduce an approval workflow where, in real-time, another user (10) must approve the request for a new account to be created before the request is forwarded to the remote server (14). In the interim, the requesting user (10) may simply be delayed (e.g., server appears slow to respond) or they would get redirected to a page to indicate that the request is waiting for approval. The new account is flagged as awaiting approval, and usage by other users (10) would not be permitted until approval has occurred.

In one embodiment, other data fields on the creation or modification form presented by the remote server (14) may be filled out automatically. This may include fields that are filled out for convenience purposes (such as address and phone number).

As many remote servers (14) send an email confirming or asking for confirmation regarding the new account creation, the proxy server (16), or a connected system, may monitor an email account for an email related to the new account on the remote servers (14). Upon reception of an email, the email may be parsed to obtain the password that was provided to or by the remote server (14). If the password obtained is intended to be temporary, the flagging of the credential record as "new" (as indicated earlier) would allow the user (10) to change the password once.

Upon reception of an email which provides a link to activate the account, the proxy server (16) may initiate a request to that link on the remote server (14), and upon detection of a further action (typically a request to login using the temporary password), automatically fill out and submit the login request. Alternatively, the proxy server (16) may initiate a request to that link on the remote server (14), and forward the response to the user (10) who was creating the account, potentially in real-time in response to their original account creation request and potentially after they have been waiting on a "waiting activation page".

The proxy server (16) may obtain from other sources, such as the community, information about the expected format of credentials for a given remote server (14).

Method for Controlling Session Secrets after Credentialed Access

After a response from the remote server (14) to the request requiring credentials, the proxy server (16) may be configured to detect session secrets. As used herein, a "session secret" means any data that may be required by the remote server to provide the client device with subsequent access to the remote server (14). As used herein, "subsequent access" includes a second access in time, continuing access, or greater access rights to the remote server (124). As used here, "side-loading" means the user (10) copying session secrets from one client device (12) onto another client device (12), or from the user (10) or client device (12) using the session secrets to access the remote server (14) directly without the proxy server (16).

In embodiments, a session secret may include data that may identify the credentials, or provide a route to access the credentials, a session ID, API keys, transaction IDs, signed certificates indicating access is permitted, multiple tokens that the remote server (14) site uses to identify subsequent requests for resources as coming from the same user (10) that previously supplied the valid credentials, or any other information or data which is desirable to keep away from the user (10) for security reasons such as prevention of side-loading. The session secrets may be part of a URL on the response page, part of a redirect URL, within a cookie setting header, within elements of the response page, or in several areas and may need to be restricted from subsequent responses as well.

In one embodiment, the proxy server (16) restricts such session secrets from the response which is visible to the user (10) or accessible to the client device (12). This prevents the user (10) from side-loading. Subsequent requests for access to the remote server (14) from the user (10) would have the session secrets reinstated before forwarding the request to the remote server (14).

The session secrets may be stored by the proxy server (16), and possibly with data that associates the session secrets with the user (10) and client device (12). In this case, the response passed to the client device (12) may have a placeholder in its place. The placeholder would assist the proxy server (16) in detecting when and where subsequent requests to the remote server (14) need to have the session secret provided. Alternatively, the response passed to the client device (12) may have scripts inserted or modified that cause placeholders to be set when the script is executed on the client device (12). For example, a JavaScript™ with a call to "SetCookie" could be inserted in the response that sets a cookie related to session secrets to have a random placeholder value and then the client device (12) will execute that script and later JavaScript™ that checks for the presence of the cookie will function correctly. Another example is that any occurrences of the GetCookie requests within JavaScript™ are replaced with code that evaluates "if(session data's key) true; else return GetCookie" or the entire function that calls GetCookie can be replaced with similar logic. Alternatively, the session secrets may be encrypted and passed to the client device (12) in the same or a different location from its original location. This session data would be sent by the client device (12) in subsequent requests and would be decrypted and replaced with the actual session data before forwarding to the remote server (14). In one embodiment, the encrypted format may deliberately resemble that of the original session secrets to reduce script errors on the client device (12) or it may be a format that is clear to the proxy server (16) to decrypt (eg: "DECRYPTME_<encryptedData>") and also may serve the role of a placeholder as described above. Another alternative is for scripts to be inserted or modified in the responses to the client device (12) where any script functions referencing the session secrets would be forwarded to the proxy server (16) out-of-band. For example, a request to check the length of a cookie would result in a request to the remote server (14) to return the length of the session secret for use by the client script but not the session secret itself. The subsequent requests to the remote server (14) may require the session secrets to be provided in any portion of the request including cookies, URLs, or data fields within a form post. The reinserting of the session secrets may be limited to portions of the request that can verifiably have been triggered by the remote server (14) to exclude maliciously crafted client requests that were not intended by the remote server (14) and would not be safe to reinsert the session secret into (for example: a form that simply gets echoed back to the client). This is done primarily based on previous responses sent from the remote server (14).

In one embodiment, detection, by the proxy server (16), of the session secrets may be done in a true/false or probabilistic manner, and may include one or a combination of the following detections: difference of the field name, value, or other attribute compared to other data; changes of the data from one session or request to another. For example, if a value or other data simply increments by 1, the value or other data is unlikely to be a session secret. If a value or other data changes more significantly, the value or other data is more likely to be a session secret. The proxy server (16) may automatically perform multiple logins or other requests to the remote server (14) to observe the change in session data, either in advance or during credential usage.

The proxy server (16) may use detected session secrets of another source. For example, if session secrets are detected in a cookie header, and the same value appears within the page data, it is very likely to include session secrets as well. The proxy server (16) may compile a known list from another source for where the session secrets are likely to be, per remote server (14) or typically across many remote server (14) sites, or a known list of data formats which are likely to be session secrets. For example, 128 bit GUIDs or cookies with specific flags set to true, have a higher likelihood of being session secrets.

The proxy server (16) may use a history of results of previous detection for this remote server (14) site, or a history of results of previous detection for other remote servers (14), potentially otherwise unrelated. This allows the system to adapt as new standard approaches of storing session secrets are adopted by different and even unrelated remote server (14) sites.

The effect of such history on the final determination of likelihood may be weighted depending on metadata about the other remote server's (14) record. The metadata may include the identity of the user who added it, how long ago, who has used it so far, and similar metadata information.

The proxy server (16) may examine various characteristics of the metadata, for example, the length or presence of English words which indicate that the metadata is not machine language, presence of symbols or uncommon characters, or the amount of entropy in the metadata.

The proxy server (16) may examine various characteristics of the remote server (14) site's current pages, or historical pages. For example, the absence of scripts that would require the information likely to be the session secrets, searching the page data and scripts (such as JavaScripts™) for specific references to that information whereby the presence of any or a specific category of usage (such as the script looking at substrings or characters within the information or combining the string with another string that is detected as a URL, versus the script simply checking if a value exists or checking the length of the value), would indicate the value is unlikely to be session secrets. The examination may use a variety of methods such as web-scraping. Another example examination method is monitoring the execution of the scripts within a sandbox on the proxy server (16), where monitoring may involve having read-hooks on the information that get executed to signal specific types of accessing or usage of the information such as those noted above.

The presence of other data, for example, if it is the only cookie setting header in response to a credential usage, may point to the likelihood of being session secrets.

A trusted tester or the user (10) may be asked if the remote server (14) is malfunctioning. If so, a less stringent threshold may be used going forward when determining what is likely a session secret. Such requests may be limited to a set number or timeframe of initial requests, and have less influence if indicated after extended successful use.

Characteristics of the access request requiring credentials or the login form may be used to indicate the system type of the remote server (14), and assist with more accurate detection, such as by associating or weighing more heavily characteristics of remote server (14) sites suggested by a database of characteristics of common website platforms.

Any method of detection can be focused more on likelihood of being required by the client device (12) (for example, needed by the remote server (14) page's JavaScript™) as opposed to likelihood of being session secrets. It can also be based on a positive confirmation of an alternative purpose for the data that suggests it is not a session secret.

The restricting of session secrets can occur for all remote servers (14), or for select remote servers (14), allowing the client device (12) to login to some remote servers (14) through the proxy server (16) and without having access to credentials but then to proceed with the remainder of the session without the proxy server's (16) involvement or from a different client device (12).

The proxy server (16) may limit access to a remote server (14) to a limited number of concurrent users (10) or client devices (12), or warn a user (10) that a great number of concurrent accesses is occurring. This may be required by some remote servers (14) that do not support concurrent access, to ensure clear auditability of what user (10) is responsible for actions on a remote server (14) during a specific timeframe, or to assist in coordination among multiple users (10).

In some embodiments, the determination of reliability or importance of many of the above examples towards making an overall determination as to whether information is a session secret or not, will vary as platforms, standards, website coding styles, and standards adoption change over time. For maximum accuracy, each factor will be tested periodically on sample data representative of many remote servers (14) to determine the up-to-date reliability of each of the above examples.

In some embodiments, there may be manual configuration of the detection of the session secrets for a remote server (14). There may also be cases where some information from remote servers (14) is automatically determined to be a session secret or not a session secret with high reliability, and some information with the determination being of lower anticipated reliability would result in taking a pre-configured default action (such as treating it as a session secret or not) as well as a notification to another user or system for their awareness or to allow additional manual configuration of the detection of the session secrets for the remote server (14). Changes to the configuration of the detection may be locked down to trusted individuals, logged, and a variety of business rules or general logic can be applied to determine if the changes are permitted.

Additional Examples for Differentiating Session Secrets from Other Information

Some of the above examples as well as the below additional examples can be grouped into the categories of examples. One category are examples that look at the scripted-client side provided by the remote servers (14), which includes for example looking at the JavaScript™ within the webpages. Another category of examples looks at the effects, as seen within data provided by the remote server (14), in response to removal or retention of information to determine if it is a session secret ("effects analysis"). Within that category, there is a subcategory of looking at the http data sent by the remote server (14), including cookie headers, other headers, redirect response codes, and other response codes ("wrapper analysis"), and another sub-category of looking at the html or equivalent data sent by the remote server (14) (which is referred to as "web analysis"). In some cases, multiple methods within the same category or multiple strategies across different categories will be combined in a priority sequence based on either the success of positively determining whether the information is a session secret or not, or based on the reliability of such a determination using that strategy.

In some embodiments, web-analysis is used specifically to look for non-response code redirects such as html http-equiv refresh headers, or a response page indicating a redirect is about to happen and contains a single link that the user (10) may click to proceed with the redirection.

In some embodiments, wrapper analysis sometimes involves the proxy server (16) requesting the same or similar resources on the remote server (14), but with a different combination of information provided or remoted. The same or similar resources used for these requests may be configured by a trusted user, may be set to the first page that the client device (12) is redirected to after a successful login attempt, the root page on the domain, an AJAX request that was located within the page that typically is provided after a successful login, or may be an alternate page. For example, this can include trying a request with only one of the cookies provided by the remote server (14) and repeating for many or all of the cookies. It can also involve trying a request with only one of the cookies removed and repeating for many or all of the cookies being the one removed. In some cases instead of one cookie, the proxy server (16) can remove two or more and systematically try different combinations. In some cases, the proxy server (16) can also obtain a baseline of all cookies being provided to the remote server (14) or none being provided.

In some embodiments, wrapper analysis evaluates whether the presence of a cookie causes the remote server (14) to respond with a request to restore a second cookie that was missing from the request. For example, sometimes a website has a "remember me" cookie where if present, will cause a short term "session id" cookie to be provided by the remote server (14). In this case, both would be considered session secrets.

In some embodiments, wrapper analysis involves evaluating the time to live (TTL) of cookies. For example, the proxy server (16) or the user (10) can submit login requests that have the "remember me" checkbox of the login form turned on, and a second login request with the checkbox turned off. In this example, the cookie that relates to "remember me" would have its TTL modified in the remote server (14) response to represent either being a short lived cookie or one that persists longer. In other examples, the presence of the "remember me" cookie in the response is entirely dependent on the checkbox being enabled, which is similarly useful.

In some effects analysis, the proxy server (16) compares the baselines of all cookies versus no cookies, isolating the differences in the response from the remote server (14). The proxy server (16) then sends the repeated requests for similar resources as described above, and compares which modifications to the cookies provided in the request to the remote server (14) result in responses that are closer to either the base-line representing a logged in response or a logged out response. Based on which one is closer, and taking into consideration what the results are of the repeated requests using other cookies as an additional comparison, the proxy server (16) can ascertain whether that cookie comprises a session secret or not.

In some web analysis, the proxy server (16) looks for the presence or absence of specific keywords such as "log out" or "log in" or the proxy server (16) looks for the presence of visible links to URLs such as the login page or the logout page. For example, combined with the technique of trying several requests to the same resource, the proxy server (16) can iterate through all of the cookies as being the cookie omitted from a request to the remote server (14), and if only two of the ten cookies result in the "log in" link disappearing, then those two cookies can be treated as session secrets. Another example of text unrelated to logging in may be the presence of the word "welcome" or the name of the user (10). In some cases, the web analysis will involve looking for login forms or password boxes using the same techniques and characteristics of a login form or password box described earlier for preventing the changing of passwords or detecting login pages.

In some embodiments, web analysis may require the proxy server (16) requesting the sub-contents of the page from the remote server (14). For example, a frame may be loaded using an AJAX request which is activated on the html page load. Web analysis may need to extend to the sub-contents of that request, and potentially recursively to several layers.

In some wrapper analysis, the proxy server (16) evaluates the response's response code and the response's redirect URL. For example, if a "401" response is received, it would indicate that the remote server (14) is missing a cookie that is required to be logged in. The cookie or cookies may then be treated as session secrets or the cookie may be combined with other analysis, and the combination may be treated as session secrets.

In some effects analysis, resources responding to AJAX requests are used as the resource. AJAX requests may be used as a way of simplifying the responses from the remote server (14) during analysis and simplify the determination of whether the remote server (14) is seeing the request as logged in (authorized) or not. For example, some AJAX requests are unlikely to have redirects or load forms, and would only result to "401" response codes which can be interpreted as logged out and therefore the missing cookies during those requests would be likely to be session secrets.

In some embodiments, in cases where analysis by the proxy server (16) cannot determine what the session secrets are, a trusted user may be presented with the responses, or the visual rendering of the responses, and can indicate to the proxy server (16) which one or several represent the case of the remote server (14) considering the request authorized and which ones did the remote server (14) treat the request as lacking the session secrets. Based on the trusted user's response, the session secrets are determined. Alternatively, a trusted user may be presented with the responses, or the visual rendering of the responses, and the trusted user may highlight or select or otherwise indicate which portions of the responses should be the focus for automated web analysis. For example, they may highlight the word "welcome" and then the proxy server (16) would focus web analysis on that element or adjacent elements.

EXAMPLE: APPLICATION TO CREDIT CARD

The techniques described herein may be applied to the use of a credit card over the Internet. Credit card information can be treated like a credential. In this embodiment, the proxy server (16) can parse any remote server (14) webpage used to facilitate credit card payment, invoices in electronic form, and other data which can be used to determine the amount of purchase, and potentially the type of purchase. In one embodiment, the rules for determining usage of the credit card information in this case could apply dollar value limits and usage count limits, as tracked by the proxy server (16). Dollar or usage limits can be tracked and enforced per user (10), per remote server (14), per user per remote server (14), or per category of remote server (14) per user (10). For example, the system may be configured such that User "A" can buy $500 in up to three orders for office supply category remote servers (14), per month. The real-time supervision or approval workflow techniques described above may apply to this example, to approve or pre-approve usage of the credit card information, which enables use of the credit card.

This specification describes various examples of the claimed invention. Although the invention has been described in language specific to structural features and/or acts in a method, the invention is defined in the claims, and is not necessarily limited to the specific features or acts described, which are only intended to be exemplary implementations of the claimed invention and not intended to be exhaustive or to be limited to any precise form disclosed. Many variations and modifications are possible without departing from the scope and spirit of the claimed invention.

What is claimed is:

1. A computer implemented method for providing a client device with credentialed access to a remote server, the method comprising the steps of:
in response to receiving, from the client device, a first request for access to first content accessible via a first Uniform Resource Identifier (URI) of the remote server, transmitting, to the remote server, a credential required by the remote server to provide the client device with access to the first URI;
receiving, from the remote server, session data comprising a session secret required by the remote server to provide the client device with subsequent access to the remote server;
receiving, from the client device, a second request for access to second content accessible via a second URI of the remote server;
in response to the second request, determining, based on one or more form elements accessible via the second URI and based on historic information corresponding to previous logins via the second URI, a target URI or data field for use in transmitting the session secret to the remote server; and transmitting, to the remote server and via the target URI or data field, the session secret to provide the client device with access to the second content accessible via the second URI.

2. The method of claim 1, wherein the remote server comprises a plurality of accounts, each associated with a different credential, and wherein the method further comprises:
transmitting, to the client device, a notification indicating which of the accounts are accessible by the client device.

3. The method of claim 1, further comprising:
authenticating, based on authentication data received from the client device, the client device.

4. The method of claim 1, wherein transmitting the session secret is further based on detecting whether the credential has changed.

5. The method of claim 1, wherein the target URI or data field is determined based on data received from the remote server, corresponding to the second content accessible via the second URI, and wherein the data received from the server is indicative of one or more of:
a URI or data field name,
a URI or data field reference,
a number of URIs or data fields,
a URI or data field length,
a URI or data field display characteristic, or
a URI or data field input type.

6. The method of claim 1, wherein the target URI or data field is determined based on data previously exchanged between the remote server and different client devices.

7. The method of claim 1, further comprising:
identifying the session secret within the session data.

8. The method of claim 7, wherein identification of the session secret within the session data is based on evaluating one or a combination of the following attributes of the session data:
a length of a character string,
a presence of a specified character, or
a pattern of characters.

9. The method of claim 7, wherein identification of the session secret within the session data is based on detecting an absence or a presence of a script referencing the session data.

10. The method of claim 1, wherein the session secret comprises a session secret cookie.

11. The method of claim 1, further comprising:
receiving, from the client device, a plurality of requests for access to a plurality of remote servers; and
selectively routing each of the plurality of requests to a corresponding remote server.

12. The method of claim 1, further comprising:
transmitting, to the client device and based on permissions corresponding to the client device, an indication of an account of a plurality of accounts.

13. The method of claim 1, wherein the second content accessible via the second URI comprises one or more elements of a web page accessible via the second URI.

14. A system comprising:
one or more processors; and
memory storing instructions that, when executed by the one or more processors, cause the system to provide a client device with credentialed access to a remote server by causing the system to:
in response to receiving, from the client device, a first request for access to first content accessible via a first Uniform Resource Identifier (URI) of the remote server, transmit, to the remote server, a credential required by the remote server to provide the client device with access to the first URI;
receive, from the remote server, session data comprising a session secret required by the remote server to provide the client device with subsequent access to the remote server;
receive, from the client device, a second request for access to second content accessible via a second URI of the remote server;
in response to the second request, determine, based on one or more form elements accessible via the second URI and based on historic information corresponding to previous logins via the second URI, a target URI or data field for use in transmitted the session secret to the remote server; and
transmit, to the remote server and via the target URI or data field, the session secret to provide the client device with access to the second content accessible via the second URI.

15. The system of claim 14, wherein either one or a combination of transmitting the credential, receiving the session data, or transmitting the session secret is performed in accordance with an HTTP or HTTPS protocol.

16. The system of claim 14, wherein the remote server comprises a plurality of accounts, each associated with a different credential, and wherein the instructions, when executed by the one or more processors, further cause the system to:
transmit, to the client device, a notification indicating which of the accounts are accessible by the client device.

17. The system of claim 14, wherein the instructions, when executed by the one or more processors, further cause the system to:
authenticate, based on authentication data received from the client device, the client device.

18. The system of claim 17, wherein the authentication data comprises data sent out-of-band to the client device.

19. The system of claim 18, wherein the data sent out-of-band to the client device comprises a one-time code.

20. The system of claim 14, wherein the target URI or data field is determined based on data received from the remote server, corresponding to the second, content accessible via the second URI, and wherein the data received from the remote server is indicative of one or more of:
a URI or data field name,
a URI or data field reference,
a number of URIs or data fields,
a URI or data field length,
a URI or data field display characteristic, or
a URI or data field input type.

21. The system of claim 14, wherein the target URI or data field is based on data previously exchanged between the remote server and different client devices.

22. The system of claim 14, wherein the instructions, when executed by the one or more processors, further cause the system to:
identify the session secret within the session data.

23. The system of claim 22, wherein the instructions, when executed by the one or more processors, cause the system to identify the session secret within the session data by causing the system to identify the session secret based on evaluating one or a combination of the following attributes of the session data:
a length of a character string,
a presence of a specified character, a pattern of characters,
a HTTP flag, or
a secure-cookie flag.

24. The system of claim 22, wherein the instructions, when executed by the one or more processors, cause the system to identify the session secret within the session data based on detecting an absence or a presence of a script referencing the session data.

25. The system of claim 14, wherein the second content accessible via the second URI comprises one or more elements of a web page accessible via the second URI.

26. A non-transitory computer-readable medium storing instructions that, when executed, cause a computing device to perform steps comprising:
  in response to receiving, from a client device, to a first request for access to first content accessible via a first Uniform Resource Identifier (URI) of a remote server, transmitting, to the remote server, a credential required by the remote server to provide the client device with access to the first URI;
  receiving, from the remote server, session data comprising a session secret required by the remote server to provide the client device with subsequent access to the remote server;
  receiving, from the client device, a second request for access to second content accessible via a second URI of the remote server;
  in response to the second request, determining, based on one or more form elements accessible via the second URI and based on historic information corresponding to previous logins via the second URI, a target URI or data field for use in transmitting the session secret to the remote server; and
  transmitting, to the remote server and via the target URI or data field, the session secret to provide the client device with access to the second content accessible via the second URI.

27. The non-transitory computer-readable medium of claim 26, wherein either one or a combination of transmitting the credential, receiving the session data, or transmitting the session secret is performed in accordance with an HTTP or HTTPS protocol.

28. The computer-readable medium of claim 26, wherein the remote server comprises a plurality of accounts, each associated with a different credential, and wherein the instructions, when executed, cause the computing device to perform further steps comprising:
  transmitting, to the client device, a notification indicating which of the accounts are accessible by the client device.

29. The non-transitory computer-readable medium of claim 26, wherein the instructions, when executed, further cause:
  authenticating, based on authentication data received from the client device, the client device.

30. The non-transitory computer-readable medium of claim 29, wherein the authentication data comprises data sent out-of-band to the client device.

31. The non-transitory computer-readable medium of claim 30, wherein the data sent out-of-band to the client device comprises a one-time code.

32. The non-transitory computer-readable medium of claim 26, wherein the target URI or data field is determined based on data received from the remote server, corresponding to the second content accessible via the second URI, and wherein the data received from the remote server is indicative of one or more of:
  a URI or data field name,
  a URI or data field reference,
  a number of URIs or data fields,
  a URI or data field length,
  a URI or data field display characteristic, or
  a URI or data field input type.

33. The non-transitory computer-readable medium of claim 26, wherein the target URI or data field is based on data previously exchanged between the remote server and different client devices.

34. The non-transitory computer-readable medium of claim 26, wherein the instructions, when executed, cause the computing device to perform further steps comprising:
  identifying the session secret within the session data.

35. The non-transitory computer-readable medium of claim 34, wherein identifying the session secret within the session data is based on evaluating one or a combination of the following attributes of the session data:
  a length of a character string,
  a presence of a specified character,
  a pattern of characters,
  a HTTP flag, or
  a secure-cookie flag.

36. The non-transitory computer-readable medium of claim 34, wherein identifying the session secret within the session data is based on detecting an absence or a presence of a script referencing the session data.

37. The non-transitory computer-readable medium of claim 26, wherein the second content accessible via the second URI comprises one or more elements of a web page accessible via the second URI.

* * * * *